United States Patent [19]
Richardson

[11] Patent Number: 6,052,224
[45] Date of Patent: *Apr. 18, 2000

[54] MICROSCOPE SLIDE SYSTEM AND METHOD OF USE

[75] Inventor: Timothy M. Richardson, Bolton, Canada

[73] Assignee: Northern Edge Associates, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/870,242

[22] Filed: Jun. 5, 1997

Related U.S. Application Data

[60] Provisional application No. 60/041,280, Mar. 21, 1997.

[51] Int. Cl.[7] .............................. G02B 21/34; G01N 21/01
[52] U.S. Cl. .................................................. 359/398
[58] Field of Search ..................... 359/396, 397, 359/398; 435/288.3, 288.4, 305.1; 436/46

[56] References Cited

U.S. PATENT DOCUMENTS

| | | | |
|---|---|---|---|
| 3,482,898 | 12/1969 | Van Den Bosch | 359/398 |
| 3,532,412 | 10/1970 | Miller | 359/398 |
| 3,551,023 | 12/1970 | Brackett | 359/398 |
| 3,556,633 | 1/1971 | Mutschmann et al. | 359/398 |
| 3,879,106 | 4/1975 | McCormick | 350/95 |
| 4,231,660 | 11/1980 | Remy et al. | 356/244 |
| 4,387,972 | 6/1983 | Valencia | 359/398 |
| 4,595,561 | 6/1986 | Thornton et al. | 422/58 |
| 4,674,846 | 6/1987 | Lippman | 350/536 |
| 4,790,640 | 12/1988 | Nason | 359/396 |
| 4,845,038 | 7/1989 | Barr et al. | 435/296 |
| 4,849,340 | 7/1989 | Oberhardt | 435/13 |
| 5,349,436 | 9/1994 | Fisch | 356/246 |
| 5,571,721 | 11/1996 | Turner | 359/398 |

FOREIGN PATENT DOCUMENTS

| | | | |
|---|---|---|---|
| 3915920 | 11/1990 | European Pat. Off. | G01N 1/00 |
| 0617282 | 9/1994 | European Pat. Off. | G01N 33/52 |
| 95/31529 | 11/1995 | WIPO | C12M 1/16 |

*Primary Examiner*—Jon Henry
*Attorney, Agent, or Firm*—Fitzpatrick, Cella, Harper & Scinto

[57] ABSTRACT

A slide system allowing rapid, sterile, clean and safe preparation and use of microscope slides containing sample materials including living and/or hazardous preparations or samples. In one embodiment, the system comprises a slide base and cover slip which are preferably pre-cleaned and supplied in a sterile wrapper. The cover slip, slide base or both have an adhesive coating that surrounds a sample area to adhere the cover slip to the slide base, thereby creating a sealed sample area or chamber that is defined by the slide, the cover slip, and the adhesive. In another embodiment, the slide base has one or two grooves or depressions in the surface of the slide base positioned within the sample area, the grooves or depressions accommodating extra or expanding sample material to prevent loss of the sample material into the environment and prevent damage to the adhesive and/or cover slip. A layer of an active element, such as a neutralizing compound, can be provided to neutralize sample materials before they escape past the adhesive. The wrapper is designed to facilitate easy handling and to permit convenient and easy mounting of sample material into the slide.

19 Claims, 16 Drawing Sheets

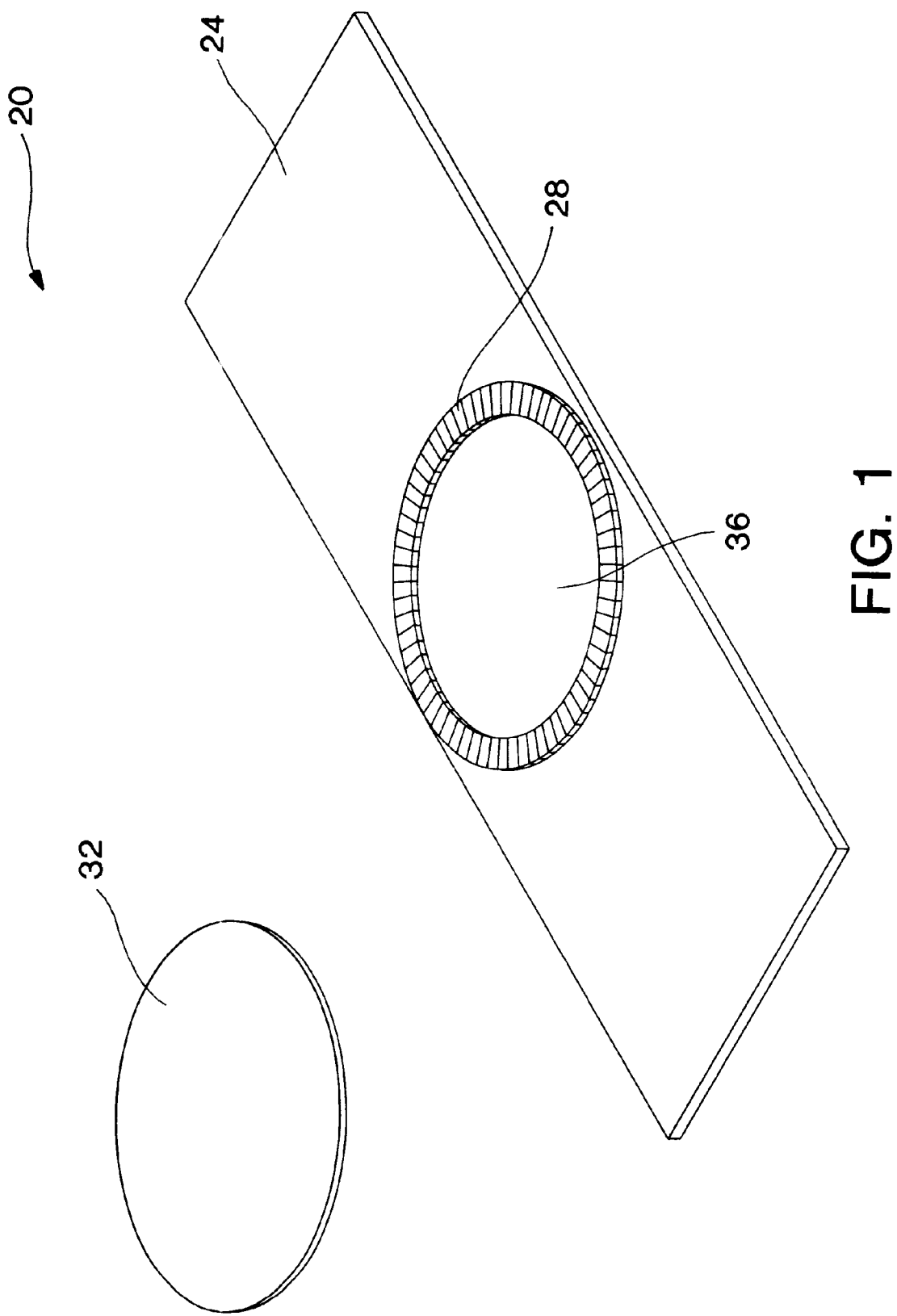

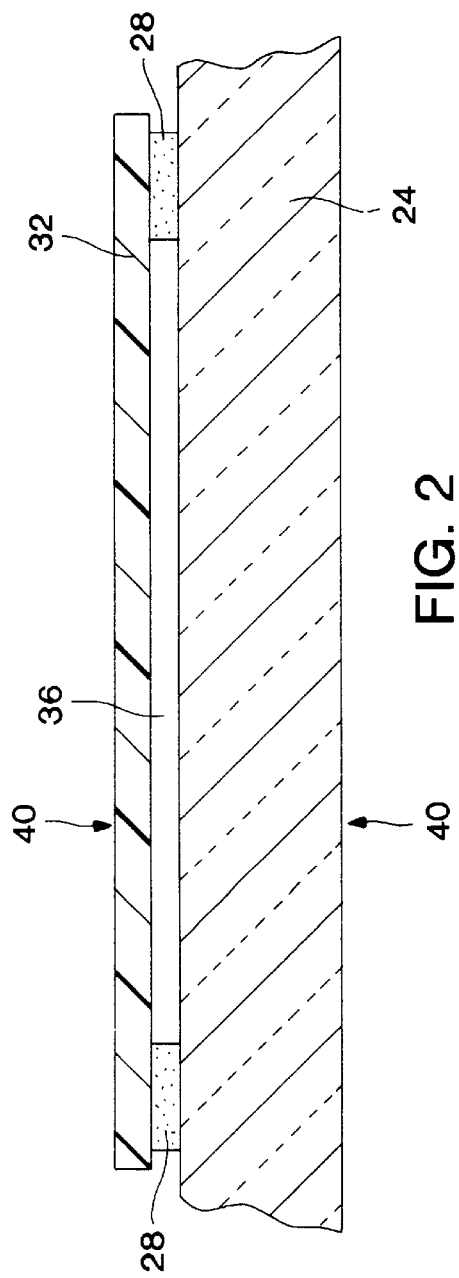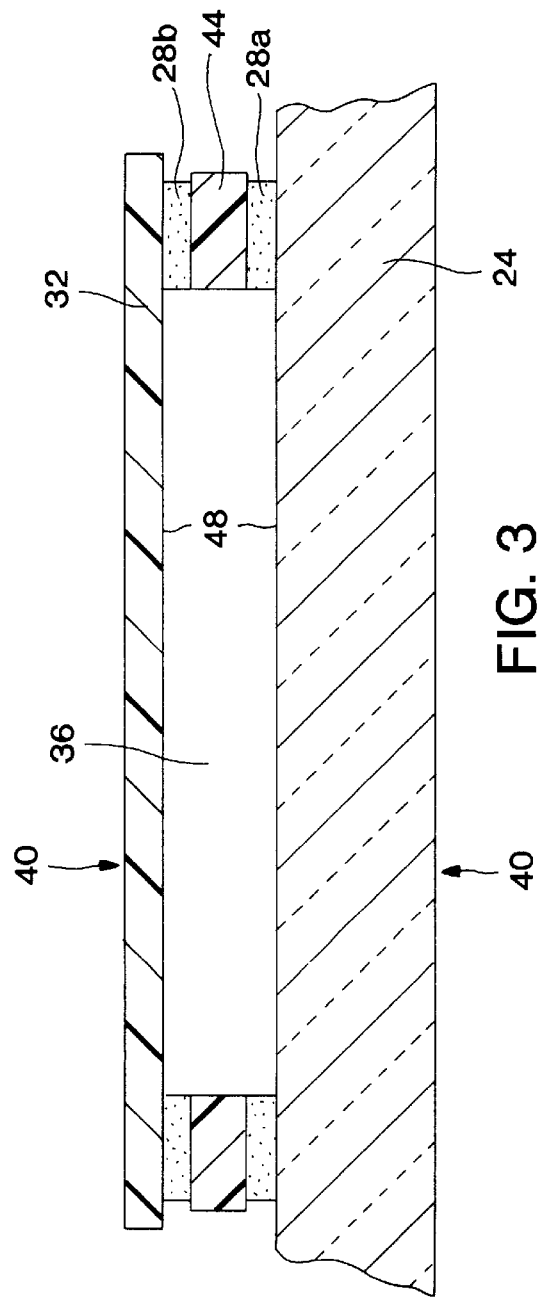

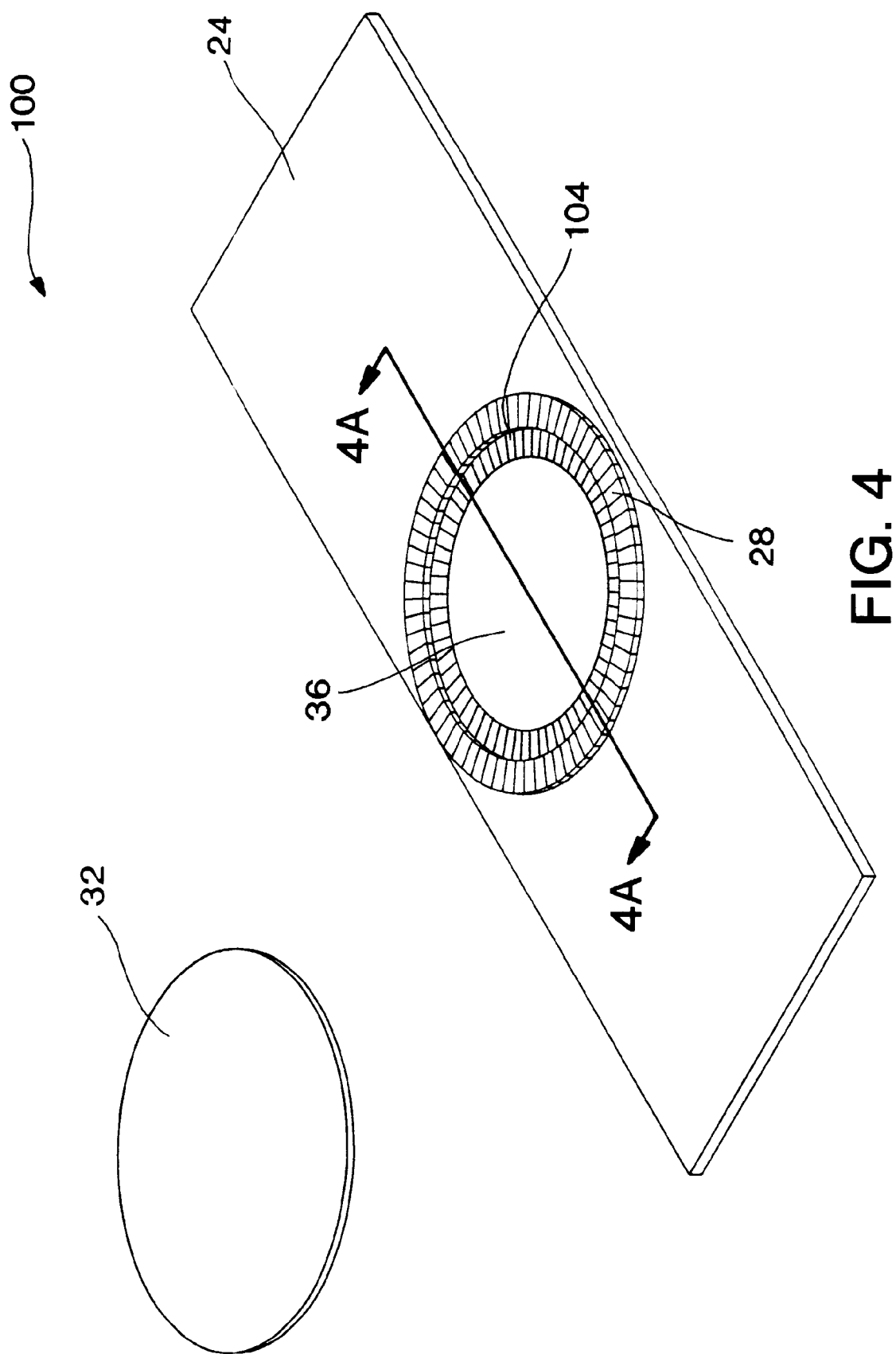

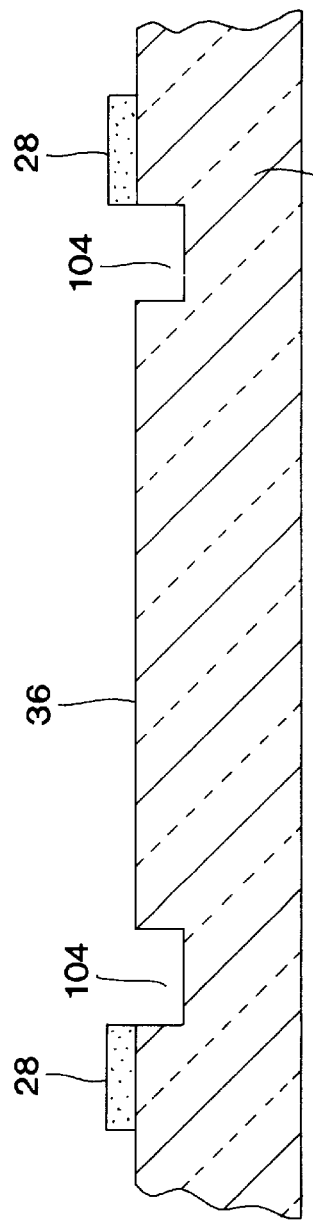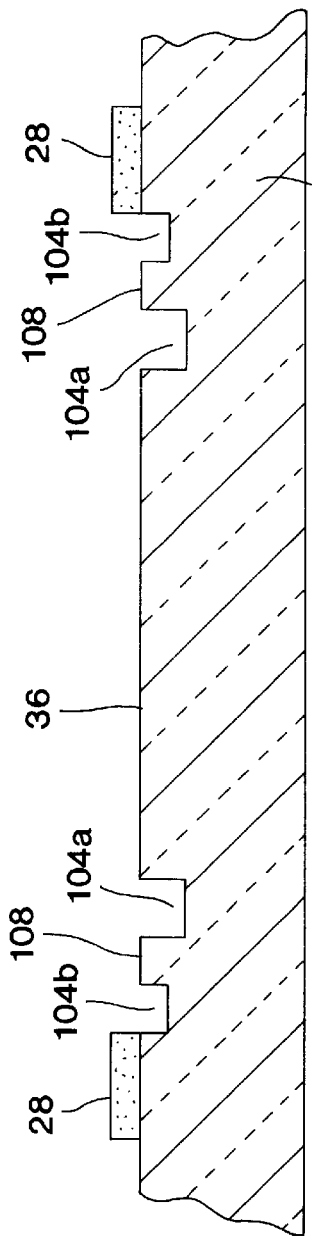

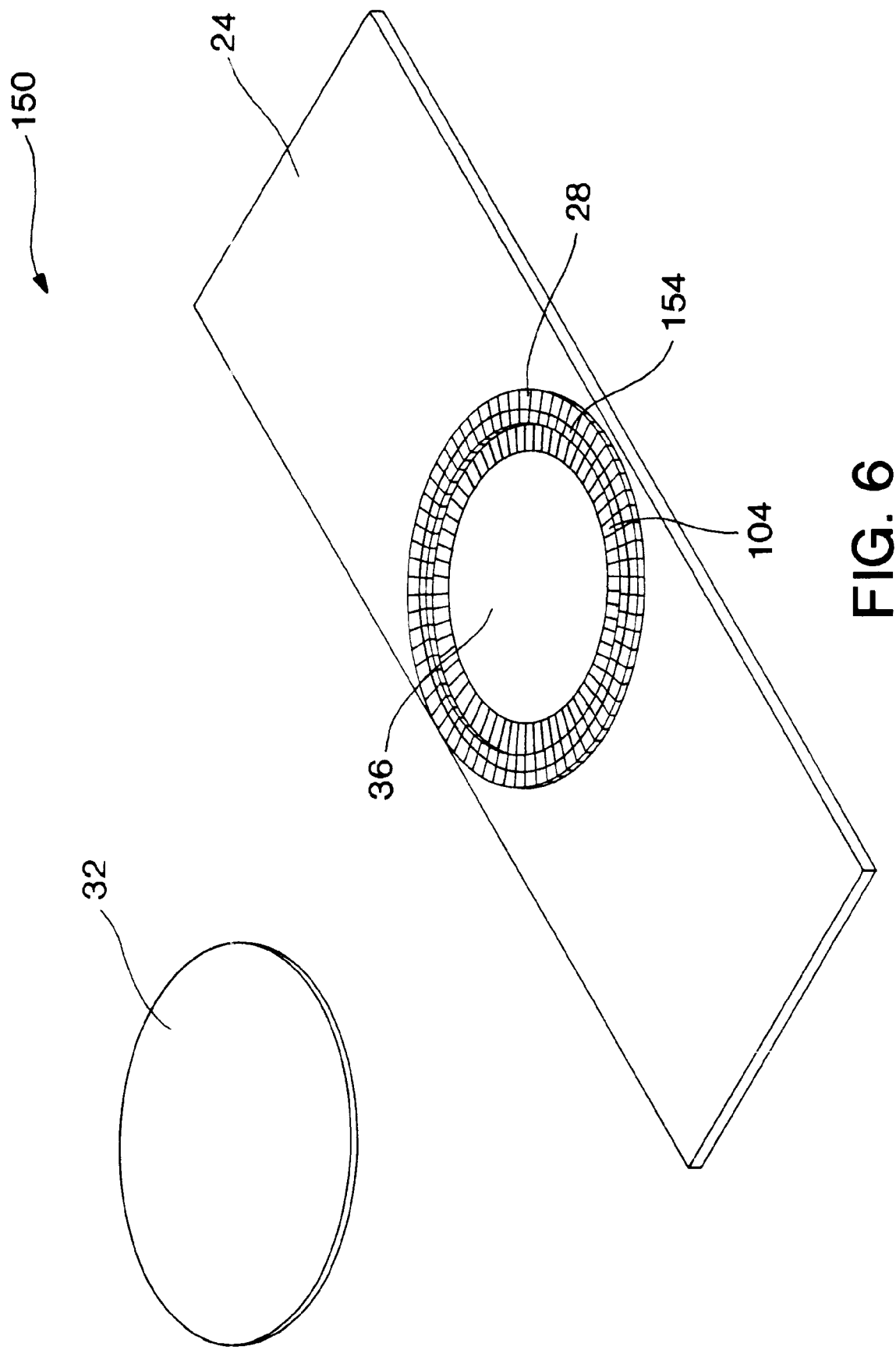

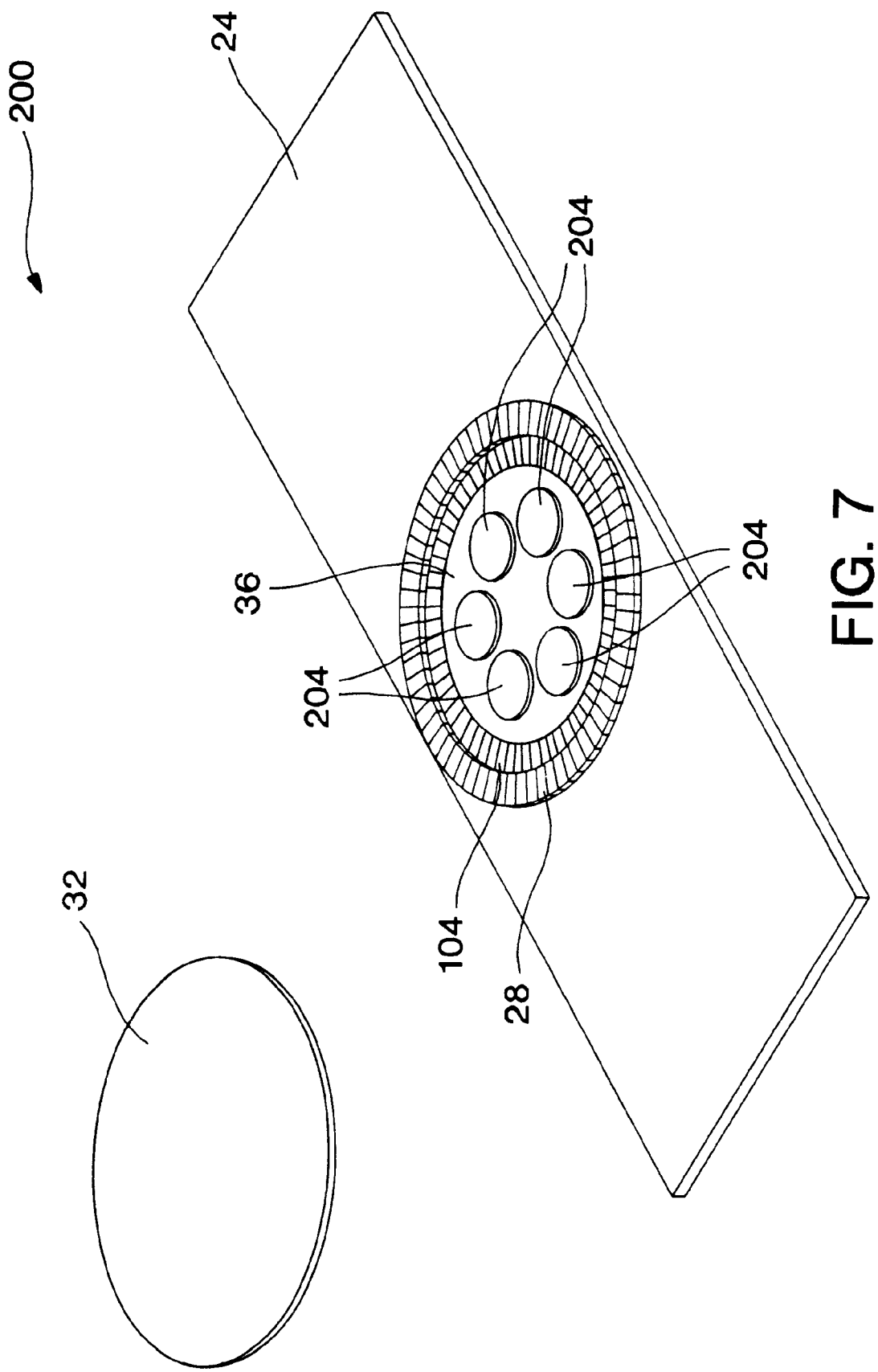

MICROSCOPE SLIDE SYSTEM AND METHOD OF USE

This appln claims the benefit of U.S. Provisional No. 60/041,280 filed Mar. 21, 1997.

FIELD OF THE INVENTION

The present invention relates to a microscope slide system and to a method of preparing specimens on microscope slides.

BACKGROUND OF THE INVENTION

The preparation of live samples, culture of cells, bacteria, viruses, other living materials, chemical compositions, etc. for microscopic examination presents technical problems in the preparation of the slide, both from a sealing perspective and from a hazard protection standpoint. The hazards presented by working with types of sample materials, such as live cells, live cultures of bacteria, viruses, or other biohazardous or chemically hazardous materials make it important to prevent the sample material from escaping from the slide into the outside environment, thereby potentially putting the microscopist and/or public and environment at risk.

The components of a conventional microscope slide include a slide base, a cover slip, and mounting media or a mountant to affix the sample material and the cover slip to the slide base. Microscope slides of living samples or samples in fluid media are conventionally prepared by simply mounting the sample material in a suitable mounting media, such as distilled water or glycerin, on the surface of the slide base. The cover slip is then placed on top of the sample material and the mounting media and is affixed to the slide base by the adhesive (surface tension) of the mounting media.

In order to obtain an accurate image of living material samples, it is essential that the slide base, cover slip, and the mountant are sterilized prior to the slide preparation process to prevent contamination of the sample. The slide preparation process is even more demanding when slides are prepared for use under very high magnifications and under special conditions including polarized light or dark field illumination. In these cases, various contaminating effects including very small contaminating particles, irregularities, and scratches in the slide, mountant, sample, or cover slip can obscure critical areas of the magnified image of the sample material. The microscopist could mistakenly interpret these contaminating effects in the sample image as being an actual part of the sample material. Conversely, the microscopist could mistakenly interpret that a real part of the sample material is an "artifact" and not part of the actual sample material. Accordingly, the clean and sterile condition of the slide, cover slip, and mounting media must be maintained while handling them during the mounting process.

In practice, the microscopist has to clean the slide base and cover slip and handle them carefully while loading a sample and/or mountant and while combining them to ensure that they are not damaged and that they and the sample and mountant is not contaminated. This process can be very difficult to achieve and is quite time consuming at best. Thus, the application of the mountant and the sample material involves a good deal of skill and attention on the part of the microscopist.

In addition, conventional microscopy slides can encounter problems when liquid sample materials are covered with a cover slip. For example, if too much sample material is placed on the slide base and the cover slip is placed on the sample material, the excess sample material will be squeezed out from under the cover slip, thereby possibly contaminating the user, the equipment, and the environment. This problem is caused by the generally incompressible nature of liquid within the sample material. To date, no practical solution has been found to address this problem.

A further disadvantage of conventional slides occurs when the sample material expands as a result of heating or chemical reaction. As a result of this expansion, the sample material may escape and contaminate the environment. To date, there has been no appropriate means or method to control the expansion of the sample material.

Further, there is a need for a convenient means and method for testing the effects of a palette of antibiotics, antiseptics and other chemical agents on bacteria, viruses, cells directly on the microscope slide.

Further, focusing of the objective of a microscope on the slide is a matter which requires careful and skilled adjustment of the fine focus and coarse focus of the microscope. This focussing process can be particularly difficult for people who are not experienced with microscope operation and are not able to judge the thickness of the prepared slide. For example, improper focussing of the objective can cause the objective lens to contact the slide, thereby damaging the objective and/or, more importantly, the prepared slide which can result in a breach in the cover slip or slide, permitting the sample material to escape therefrom. This is especially worrisome when the sample material is toxic or biohazardous as the sample can contaminate the microscope and the environment.

SUMMARY OF THE INVENTION

It is an object of the present invention to provide a novel microscope slide system. It is a further object of the present invention to provide a novel method of preparing microscope slides.

According to first aspect of the present invention, there is provided slide system for microscopy comprising: a slide base; a cover slip; and an adhesive layer on a surface of at least one of said slide base and said cover slip, said adhesive layer surrounding a portion of said surface such that when said slide base and cover slip are engaged with said adhesive layer to form an assembled slide, said adhesive layer and said cover slip enclose and define a sealed sample area.

According to another aspect of the present invention, there is provided a method of preparing a slide for microscopy, comprising the steps of: (i) placing a sample material on a surface of one of a slide base and a cover slip within a sample area surrounded by an adhesive material on said surface; (ii) locating the other of said cover slip and said slide base over said sample area to engage said adhesive material; and (iii) pressing said slide cover and said slide base to form a sealed sample area.

According to another aspect of the present invention, there is provided a slide system for microscopy comprising:
  a cover slip; and
  a slide base including a surface having an expansion volume formed there, said expansion volume surrounding a sample area on said surface and receiving sample material from said sample area when said cover slip is placed on said sample area.

BRIEF DESCRIPTION OF THE DRAWINGS

Preferred embodiments of the present invention will now be described, by way of example only, with reference to the attached Figures, wherein:

FIG. 1 shows a microscope slide system in accordance with the present invention;

FIG. 2 shows a cross-section through a sample area of an assembled slide system of FIG. 1;

FIG. 3 shows a cross-section through a sample area of an assembled slide system of FIG. 1 which further includes a spacer;

FIG. 4 shows another microscope slide system in accordance with the present invention;

FIG. 4a shows a cross-section taken along line 4a–4a of FIG. 4;

FIG. 5 shows a cross-section through a sample area of a microscope slide system in accordance with the present invention which includes two expansion volumes;

FIG. 6 shows another microscope slide system in accordance with the present invention which includes an active element;

FIG. 7 shows another microscope slide system in accordance with the present invention which includes test materials;

DETAILED DESCRIPTION OF THE INVENTION

Figure 8:
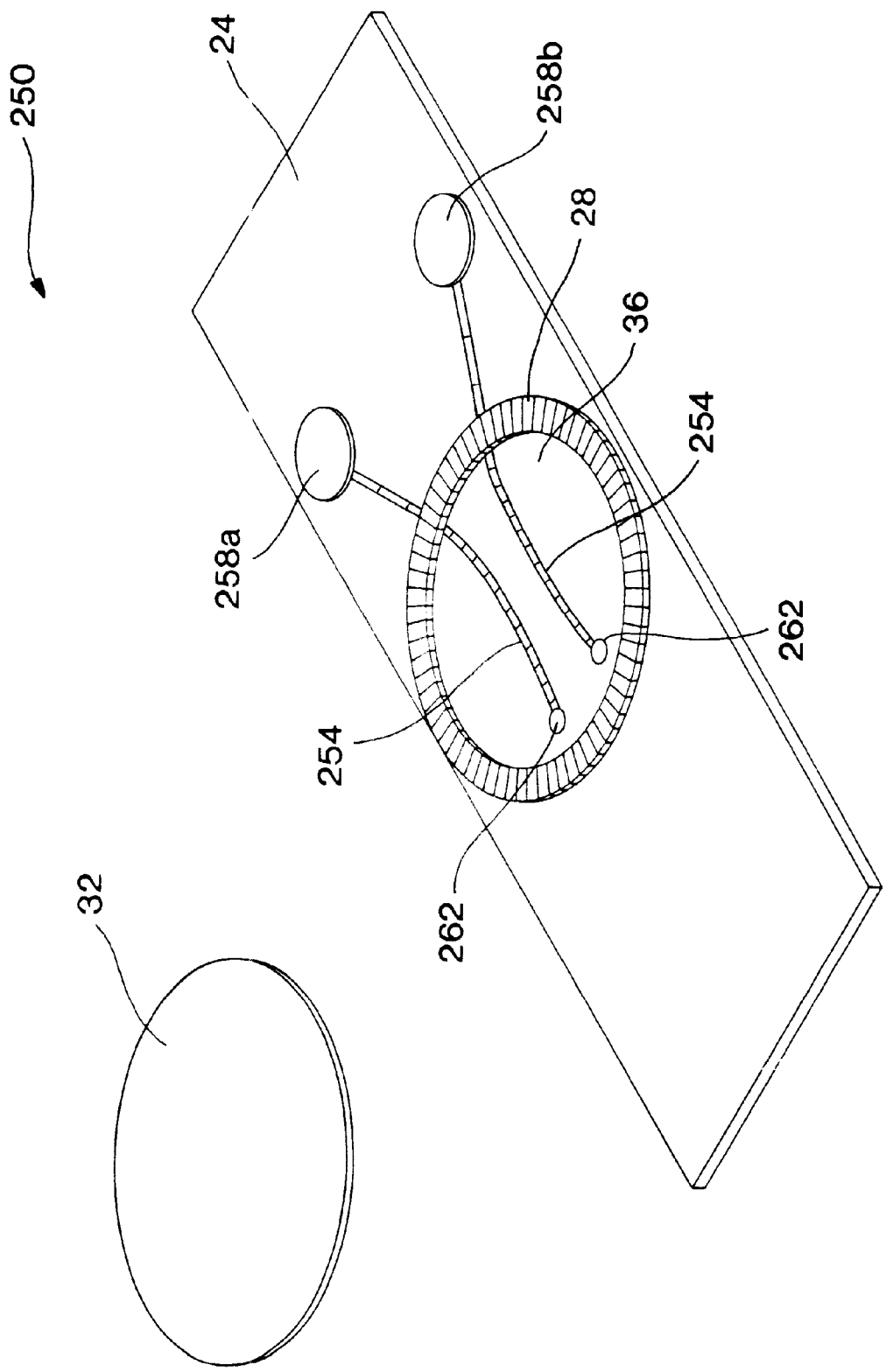
FIG. 8 shows another microscope slide system in accordance with the present invention which includes electrical conductors.

A microscope slide system according to the present invention is indicated generally at 20 in FIG. 1. As shown, slide system 20 includes a slide base 24, an adhesive 28 region and a cover slip 32. In this embodiment of the present invention, adhesive 28 is located on an upper surface of slide base 24 and encircles a sample area 36 on slide base 24 which is intended to receive sample material (not shown).

In the example of FIG. 1, adhesive 28 is applied only to slide base 24. However, it is contemplated that adhesive material can be applied to slide base 24 and/or cover slip 32, depending on the application. For example, in cases where living cells are cultured on cover slip 32, adhesive 28 could be located only on slide base 24.

The particular adhesive used is not particularly limited and any suitable adhesive as will occur to those of skill in the art can be employed. For example, adhesives such as #200, "Hi-Performance" Acrylic adhesive, manufactured by the 3M Company, can be employed for permanent sealing or #300, "Hi-Strength" Acrylic adhesive or #320, "Hi-Tenacity" Acrylic adhesive, also manufactured by the 3M Company can be employed for moderate sealing requirements.

It is also contemplated that the adhesive could have a variety of forms. For example, the adhesive can be applied as a one-part adhesive system and coated onto either or both of slide base 24 or cover slip 32. Alternatively, it is contemplated that the adhesive could also comprise a two part adhesive system, with a first part applied to slide base 24 and an activating second part applied to cover slip 32 such that when cover slip 32 is placed over sample area 36, the two adhesive regions are brought into contact and the adhesive bond is formed by the catalytic or stoichiometric reaction of the two adhesive parts. It is also contemplated that a settable adhesive can be employed, for example a thermosetting or UV-curable adhesive can be employed, depending upon whatever limitations the sample material will impose on the setting process.

Further, the adhesive could be applied in the form of a diecut adhesive double-sided tape or film. The adhesive on the double-sided tape can be a permanent hardening adhesive such as 3M™ automotive trim adhesives. It is also contemplated that the tape's adhesive could be a long term flexible type and/or removable adhesive such as those used in adhesive bandages or tapes.

A low tack adhesive can be employed in situations where the ability to remove cover slip 32 to access the sample material and/or add to it, is desired. Adhesives such as #1000 Repositionable Acrylic adhesive as manufactured by the 3M Company can be employed for this purpose. In such a case, for example, cover slip 32 can be removed to access sample area 36 and then replaced, as desired. Such an adhesive is also useful for adhering components of slide system 20 to a packaging material, as described below.

It is further contemplated that a serial number, or batch number, can be provided for slide system 20. In particular, it is contemplated that a serial number can be provided within sample area 36 to allow unique identification of the samples in sample area 36. Preferably, such a serial number will be formed on slide base 24 within sample area 36 by any suitable method, including lithographic techniques, etc. as will occur to those of skill in the art, although such a serial number can instead be provided on cover slip 32, on slide base 24 outside of sample area 36, or omitted altogether.

In use, a suitable amount of the sample material (not shown) is placed within sample area 36, with or without a mountant, and cover slip 32 is then placed over adhesive 28 and pressed, thereby adhering cover slip 32 to the slide base 24. It is contemplated that the sample material can be deposited into sample area 36 using conventional pipetting or micro pipetting techniques with disposable pipettes wherein the pipettes will be calibrated to deliver a precisely measured quantity of sample material to sample area 36 or via any other suitable method of providing a selected amount of sample material, as will occur to those of skill in the art.

Cover slip 32 is maintained in place by adhesive 28 which also encircles sample area 36 and which forms a barrier to maintain the sample material therein. FIG. 2 shows a cross section through a completed slide system 20. As will be apparent to those of skill in the art, adhesive 28 need not be ring-shaped, and square, rectangular or other shapes which may be preferred can be employed for adhesive 28, provided that sample area 36 is surrounded thereby. Also, it is not required that adhesive 28 and cover slip 32 have corresponding shapes, provided that when cover slip 32 engages adhesive 28, sample area 36 is substantially sealed. For example, cover slip 32 can be rectangular, allowing easy alignment with slide base 24, while adhesive 28 is applied in a ring-shaped or square-shaped pattern.

As shown in FIG. 2, the total thickness 40 of a slide produced with system 20 is established by the thickness of adhesive 28, the shaped and dimensions of slide base 24 and cover slip 32 and the force applied to adhere cover slip 32 to adhesive 28. A contemplated advantage of the present invention is that, by carefully controlling the thickness 40 of the slide produced with system 20, the possibility of accidental damage to the microscope's objective lens and/or slide 20 by the objective lens striking the slide can be reduced.

If a desired thickness cannot be obtained with the thickness of adhesive region 28, a spacer 44 can also be employed, as shown in FIG. 3, to obtain the desired thickness. In FIG. 3, and subsequent Figures, like components to those shown in FIGS. 1 and 2 are indicated with like reference numerals. As shown, when assembled a first adhesive layer 28a affixes spacer 44 to slide base 24 and a second adhesive layer 28b affixes cover slip 32 to spacer 44. As is the case with adhesive 28 in the example of FIGS. 1 and 2, the shape of spacer 44 is not particularly limited provided that its upper and lower surfaces can form appropriate sealed bonds with slide base 24 and cover slip 32 and that sample area 36 has a desired area. It is contemplated that slide system 20 can be provided with spacer 44 already affixed to slide base 24 by adhesive layer 28a, requiring only the loading a sample material into sample area 36 and the placement of cover slip 32 onto adhesive layer 28b. It is also contemplated that spacer 44 can be provided separately, in one or more thicknesses, for use when needed. In this latter case, adhesive layers 28a and 28b can be provided on spacer 44 or on slide base 24 and/or cover slip 32, as desired.

It will be appreciated that, in addition to altering the total thickness 40 of a slide produced with system 20, the thickness 48 of sample space 36 can also be altered. It is contemplated that the spacer can be manufactured of any material suitable for the particular microscopy investigation, including materials such as nylon, Delrin™ or glass.

In some circumstances, it may not be possible or commercially feasible to obtain a desired small thickness of adhesive to accommodate the thickness of sample material desired for the microscopical application in question. For example, if a sample material thickness of ten microns is desired, it can be difficult to find an adhesive 28 which could be applied effectively in a thickness of ten microns. In such cases, material is removed from slide base 24, by etching, machining, grinding either chemically or mechanically, or by any other suitable technique, in the area where adhesive 28 is to be applied. As a result, a thicker adhesive 28 can be applied into the removed area without compromising the final closed total thickness of the slide system. Also, the process of etching back or grinding back a circular-shaped area in the surface of slide base 24 to accommodate adhesive 28 can assist in the alignment and location of slide base 24 and cover slip 32.

The close control of total thickness 40 has another advantage when used with a slide holder of carefully controlled thickness. In that case, the z-axis location (i.e.—perpendicular to the plane of slide base 24) of sample space 36 and the upper surface of cover slip 32 is easily predetermined and together define a reference position. The consistency of this reference position makes it possible to use a computer and stepper motors to rapidly move the objective lens to this known reference position with reduced risk of accidentally causing the microscope objective to strike the slide. This allows the microscopist to quickly and safely find the proper focus in the center of sample space 36 and to adjust the focus from this reference point higher or lower into the sample material as desired.

It is also contemplated that the refractive index and scattering properties of adhesive 28 can be selected to allow adhesive 28 to become a source of side lighting for dark field or ultramicroscopic applications. Further, adhesive 28 can contain phosphors or fluorescent compounds which can act as a side light source for illumination of the sample material. Additionally, phosphors and fluorescent compounds in adhesive 28 can be used to maintain quality control during manufacture, application, use and storage of slide system 20. For example, it is contemplated that in the case of an adhesive 28 containing fluorescent compounds, adhesive 28 can be tested under UV light to identify gaps or voids and/or to identify contamination of adhesive 28 during manufacture, or after cover slip 32 is sealed to the slide base 24 during actual use.

While slide base 24 is shown having conventional microscope slide dimensions (i.e.: about 1 inch by 3 inch dimensions), slide base 24 can have any suitable shape and dimensions including round, square, or any shape that is suitable to the specific microscopy application. Further, slide base 24 and cover slip 32 can be made of any suitable material that is transparent at the wavelengths of interest. For example, for visible light use, optical plastics such as: polymethyl methacryate (commonly sold under the trademarks Lucite and/or Plexiglass); polystyrene (commonly sold under the trademarks Styron and Lustrex; polycarbonate (commonly sold under the trademark Lexan); and styrene acrylonitrile (commonly sold under the trademarks Lustran and Tyril) can be employed. Examples of glasses which are suitable for visible light use include glasses such as BK7, manufactured by Schott Glass Technologies Inc., 400 York Avenue, Duryea, Pa., USA, or any other suitable glass as will occur to those of skill in the art.

In the case of infra red (IR) light use, materials such as silicon or AMTIR can be used or other suitable materials. In the case of ultraviolet (UV) light use, materials such as fused quartz, crystalline quartz, sapphire, spinel, zircon, diamond, calcium fluoride, lithium fluoride, or magnesium fluoride can be used or any other suitable materials. Cover slip 32 can be made of the same material as slide base 24, or can be of a different material. For example, the material of cover slip 32 can be chosen to match, complement, or correct for, the refractive index and dispersion of the sample material or mounting media or for the immersion fluid. Also, slide base 24 and/or cover slip 32 can also be fabricated from colored glass or optical plastic, or a colored layer applied thereto, to filter the wavelengths of the light illuminating sample area 36.

Slide base 24 or cover slip 32 can be coated with one or more layers of suitable transparent materials to correct for chromatic aberrations caused by the particular wavelength of light used to illuminate the sample material. Alternatively, slide base 24 or cover slip 32 can be formed of two or more layers of different materials for the same purpose.

For deep UV and X-ray microscopy use, thin films of metal, crystalline substances or any other suitable material can also be applied to slide base 24 and/or cover slip 32 and undesired material then removed, as is discussed below in detail with reference to FIG. 15. Slide base 24 or cover slip 32 can also include a polarizing material on its lower surface, including polarizing films and coatings, in order to provide polarized light to the sample material. Further, diamond, zircon, polarizing or mirrored surfaces or the like can be provided on slide base 24 or slide base 24 can be formed of multiple layers to allow conduction of light along the XY plane (i.e.—within the plane of slide base 24) of slide base 24 by total internal reflection.

Further, sample area 36 in slide base 24 can be specifically modified to provide a number of different effects to the sample material. For example, it is contemplated that the surface of slide base 24 in the sample area 36 can be etched to diffuse the light from an the light source, thereby providing diffuse lighting of the sample material. The surface of slide base 24 in sample area 36 can also be tapered into the surface of slide base 24, by etching or machining or any other suitable technique including ion etching, laser etching, waterjet or solid particle jet erosion, casting, pressing or grinding of slide base 24. The increased depth of the resulting sample space 36 permits the microscopist to focus through various depths of sample material and allows the microscopist to assess the size of the sample material and/or the sample material's components.

Referring now to FIGS. 4 and 4a, another slide system in accordance with the present invention is indicated generally at 100. As shown, system 100 includes a slide base 24, an adhesive 28, a cover slip 32 and a sample area 36, as before. In addition, slide system 100 further comprises an expansion volume 104, between adhesive 28 and sample area 36 and surrounding sample area 36. Expansion volume 104 is provided to accommodate sample material and/or mountant which is expressed from sample area 36 as cover slip 32 is pressed to adhesive 28 to produce a slide. In addition to sample material and/or mountant which is expressed from sample area 36, expansion volume 104, air or other ambient gas can be compressed into volume 104 during the closing operation, inhibiting damage to the seal between slide base 24, adhesive 28 and cover slip 32 due to pressure build-up in sample area 36. In addition, fluids and gases in sample area 36 can expand due to heat caused by the microscope light source or by chemical reaction after the seal is completed during slide preparation.

Expansion volume 104 is also intended to receive such materials expressed from sample area 36 after production of a slide. By receiving expressed materials, expansion volume 104 reduces the possibility of the expanding sample material, especially hazardous sample material, from damaging the seal of adhesive 28 and/or escaping from the slide and contaminating the laboratory environment. Also, expansion volume 104 serves to isolate sample material from contacting adhesive 28, thereby inhibiting contamination of the sample material by adhesive 28. Expansion volume 104 can also include materials which it is desired to supply to sample area 36. For example, if the sample material in sample area 36 comprises a bacteria, a coating of bacterial nutrient can be deposited within expansion volume 104, leaving some of volume 104 empty. Another example is if a crystallization process is to be observed in sample area 36, a reservoir of solute to supply the process can be provided in volume 104. In such cases, it is contemplated that migration of sample material between sample area 36 and expansion volume 104 will be desirable, and intentionally induced, by thermal means (heating and cooling of the sample material), by mechanical means (compressing and releasing cover slip 32), or by any other suitable means as will occur to those of skill in the art.

Expansion volume 104 can be in the form of a groove, moat, well, or tapered area recessed into the upper surface of slide base 24 or any other suitable structure as will occur to those of skill in the art. In general, expansion volume 104 is outside sample area 36 and can be created by chemical or mechanical etching of slide base 24 or by any other suitable means such as ion etching, laser etching waterjet or solid particle jet erosion, casting, pressing or grinding of the slide material. Alternatively, expansion volume 104 can be formed by creating a cavity in a center layer of a two layer slide base with appropriate connecting ports or conduits to the enclosed sample space.

While it is presently preferred that expansion volume 104 be provided in combination with adhesive 28, it is contemplated that in some circumstances adhesive 28 can be omitted. In such cases, surface tension of the sample material will provide sufficent adhesion of cover slip 32 to slide base 24 and sample area 36 will surrounded by expansion volume 104.

If desired, more than one expansion volume 104 can be included to provide redundancy and/or an indication of the historical state of sample material. For example, as shown in FIG. 5, two expansion volumes 104a, 104b are provided in the form of concentric moats surrounding sample area 36, each volume 104a, 104b being spaced from the other and not in direct fluid communication therewith. In such a case, volume 104a can receive expressed sample and/or mountant materials when the slide is fabricated but material will only be expressed to volume 104b if volume 104a is substantially full, indicating improper production of the slide or subsequent mistreatment of the slide due to over heating, excessive closing force, etc. Additionally, volume 104b serves to further isolate sample material from contact with adhesive 28, further inhibiting contamination of the sample material by adhesive 28. If security of the sample material is essential, for example with particularly biohazardous materials, then the land 108 between volume 104a and volume 104b can also be provided with an adhesive to adhere to cover slip 32. In such a case, sample material must fill volume 104a, penetrate the seal provided by the adhesive on land 108, fill volume 104b and penetrate the seal of adhesive 28 before it can reach the outside environment. It is also contemplated that adhesive on land 108 will further inhibit subsequent tampering or access to sample material in sample area 36 once cover slip 32 has been adhered thereto.

In the example of FIG. 5, expansion volume 104b is shallower than expansion volume 104a. It is contemplated that, in some circumstances, it will be desirable to intentionally express sample material into expansion volumes 104, expansion volumes 104 effectively acting as a portion of sample area 36. This will allow different thicknesses of sample material to be arranged with sample area 36 and can permit sample material comprising living cells to move within volumes 104 in different ways, depending on the relative depth of volumes 104. Additionally, expansion volumes 104 can have different depths to accommodate different thicknesses of sample material and this relative difference of depths allows stereoscopic, 3D or spectroscopic measurements of the sample material to be made at different sample thicknesses.

It is also contemplated that expansion volumes 104 are not limited to constant depths, and the depth can vary with the distance from sample area 36 or can vary with the angular location about sample area 36.

Referring now to FIG. 6, another slide system in accordance with the present invention is indicated generally at 150. In addition to slide base 24, adhesive 28, cover slip 32 and expansion volume 104, slide system 150 further comprises an active element 154 which surrounds sample area 36 between adhesive 28 and expansion volume 104. It is contemplated that active element 154 can comprise a variety of substances or combinations of substances, such as antibiotic, antiseptic or radioactive substances suitable for neutralizing particular biohazardous sample materials. In use, if a sample material expands or otherwise migrates past expansion volume 104, the sample material will contact active element 154 and thereby be rendered neutralized or safe before contact with adhesive 28. In other uses, active element 154 can be combined with adhesive 28, requiring only a single application of adhesive/active material to slide base 24. In slide system 150, expansion volume 154 serves to isolate active element 154 from the sample material itself to prevent undesired influence of active element 154 on sample material in sample area 36. As an additional form of isolation, it is contemplated that active element 154 can be deposited onto slide base 24 between two concentric adhesive 28 layers (not shown). While it is presently preferred that active element 154 will be applied to slide base 24, it is contemplated that in some circumstances active element 154 and/or adhesive 28 can instead, or in addition, be applied to cover slip 32 if desired.

FIG. 7 shows another slide system in accordance with the present invention is indicated generally at 200. System 200 is quite similar to system 100 of FIG. 4 with the addition of one or more regions 204 of test materials to sample area 36. It will be appreciated that it is often important to test the effect of different substances on samples in a living state and this can be readily accomplished using slide system 200. Further, slide system 200 is believed to be particularly suited to testing surface phenomena, such as the effect of catalysts on chemical reactions etc., crystallization phenomena, etc. by introducing test materials to these processes and allowing observation thereof. As shown in FIG. 7, a palette of six regions 204 of test materials have been deposited onto sample area 36 of slide base 24. Each region 204 can include a different substance whose interaction with a sample material is of interest. For example, each region 204 can comprise a different one of six different antibiotic materials which it is desired to expose a sample material to or can comprise different catalysts which it is desired to expose sample material reagents to. Further examples of likely testing materials include antiseptic compounds, antibiotics, antibacterial agents, biological agents, antibodies, various test chemicals such as pH testing chemicals, stains, fluorochromes, or immunologically based fluorochromes, commonly known as immune antigen fluorochromes.

It is contemplated that an indication will be provided to the microscopist, either on slide base 24 or on accompanying materials, as to what material is in each region 204. It is contemplated that slide system 200 will be available for various uses with standard sets of test materials. For example, slide system 200 can be provided to hospitals with a standardized set of antiseptic test materials and slide system 200 can be provided to analytic chemistry laboratories with a standardized set of reagent test materials. Slide system 200 can be conveniently pre-packaged at a manufacturing facility under sterile conditions. It is also contemplated that in some circumstances, supplied test materials can comprise other materials, such as bacteria or viruses.

The use of slide system 200 will be apparent to those of skill in the art. For example, a set of six common antibiotics can be provided in areas 204 and a sample material, such as living bacteria, is then deposited in sample area 36 and cover slip 32 is brought into engagement with adhesive 28 to seal the bacteria sample within sample space 36. A researcher can then observe the reaction of the bacteria to the six different test antibiotics through the microscope and observe which of six test areas 204 adversely affects the bacteria.

The synergistic effects between different chemicals and antibiotics can also be easily tested using slide system 200. For example, the H-pyloria bacterium has been found to be resistant to standard antibiotics such as tetracycline but the bacteria are susceptible to tetracycline when the tetracycline in used in the presence of a bismuth compound. Tests of this type can be rapidly conducted using slide system 200 wherein it is contemplated that an antibiotic can be located in area 204 alongside, in conjunction with, or mixed with another chemical compound, chemical antiseptic or even a second antibiotic. The exact effects of the combination on the bacterial sample material can then be conveniently studied.

Test materials such as stains, fluorchromes, vital stains or vital fluorochromes can also be employed in test areas 204. In such a case, living sample material and suitable media are placed in sample area 36 and, over a period of a few minutes, material in test areas 204 will dissolve into the media and will be taken up selectively by the applicable portion of the living sample material. The results are then observed under the microscope. This permits the clinician to avoid the separate staining step that is normally associated with the use of vital stains or vital fluorochromes on a slide. This is particularly advantageous as vital stains and fluorochromes are dangerous to handle and providing such materials as test materials in slide system 200 mitigates the risk to the clinician.

It is contemplated that areas 204 of test material can be deposited on slide system 200 by known printing, thin film coating or vacuum chemical deposition methods and techniques, or any other suitable method as will occur to those skilled in the art. If it desired to provide a larger amount of test material, or to localize where in it applied, wells or depressions (not shown) can be recessed into the surface of slide base 24 and then filled with the desired testing materials.

While FIG. 7 shows test regions 204 as six equal-sized circular areas, the present invention is not limited to six test areas, nor do test areas 204 have to be circular or equi-sized. Further, while it is presently preferred that test area 204 be applied to slide base 24, to allow observation of sample material above test areas 204, it is contemplated that in some circumstances it can be desired to apply test areas 204 to cover slip 32 or to both cover slip 32 and slide base 24. In fact, in a presently preferred aspect, test for synergistic effects between test materials can be accomplished by providing regions 204 on both slide base 24 and cover slip 32 in sample area 36. In such a case, a set of two or more test materials of interest are provided as a series of "stripes" across slide base 24 in sample area 36, each stripe being one test material. A second set of test materials, either the same or differing from those of the first set, are provided as a set of "stripes" across cover slip 32 in sample area 36. In use, sample material is placed in sample area 36 and cover slip 32 is adhered to adhesive 28 with its stripes orthogonal to the stripes on slide base 24 to form a "checkerboard" of test materials whose intersection points provide combinations of the test materials.

It will be appreciated that slide system 200 provides a rapid and convenient system and method of conducting assays of a sample material's characteristics and susceptibilities employing microscopic analysis. Further, this system can be used to test other infectious agents, both as a sample material and as a test material, including viruses, cells, fungi and parasites as well as bacteria. Also, phototoxic materials can be employed as test materials aloowing simple and effective observation of phototoxic tests.

FIGS. 8, 9, 10 and 11 illustrate additional slide systems in accordance with the present invention. In these systems, electrical conductors and/or electrical components are provided in the slide system and can be used for testing the electrical properties of a sample material, including characteristics such as electrophoresis, electrolysis, electrochemical action, corrosion and dipolar behaviour. The electrical conductors and/or components can be formed by any suitable known manner, including semiconductor manufacturing techniques.

In FIG. 8, a slide system in accordance with the present invention is indicated generally at 250. In system 250 electrical conductors 254, shown as conductive traces, are formed within sample area 36 using suitable techniques, such as semiconductor manufacturing or printed circuit board fabrication techniques. Conductors 254 extend out of sample area 36 and are connected to terminals 258a, 258b located on the surface of slide base 24 outside of sample area 36. Preferably, conductive circles 262 are connected to the ends of the conductors 254 to prevent field concentrations at the ends thereof. It should be noted that adhesive 28 covers conductors 254 such that sample area 36 is still sealed when cover slip 32 is adhered to adhesive 28.

Slide system 250 can be employed in a similar manner to the slide systems described above but with the additional capability that conductors 254 can be used for electrical testing of living sample material or mobile sample material within sample space 36. For example, an electrical potential can be applied between conductors 254, via contacts 258a and 258b, to cause an electrophoresis reaction to occur in sample space 36 between the conductors. The electrophoresis reactions can thereby be observed through the microscope, under suitable lighting conditions, such as under reflected or transmitted light. Thus, a researcher can examine precisely the electrochemical or bioelectrical effects on living systems or on mobile material samples. Further, slide system 250 provides new opportunities in the area of electro-chemistry for studying the precise reactions that are involved in electrochemical deposition or decomposition and interactions. While it is presently preferred that conductors 254 and contacts 258 be formed on slide base 24, the present invention is not so limited and it is contemplated that these features can be provided on cover slip 32, if desired. In such a case, it is further contemplated that conductors 254 can be provided on each of cover slip 32 and slide base 24 and thus an electric potential can be applied vertically through sample area 36, if desired. It is also contemplated that conductors 254 can be traces of magnetic material, which need not necessarily be electrically conductive, to allow studies of the effects of magnetic fields on sample material in sample area 36.

Figure 9:
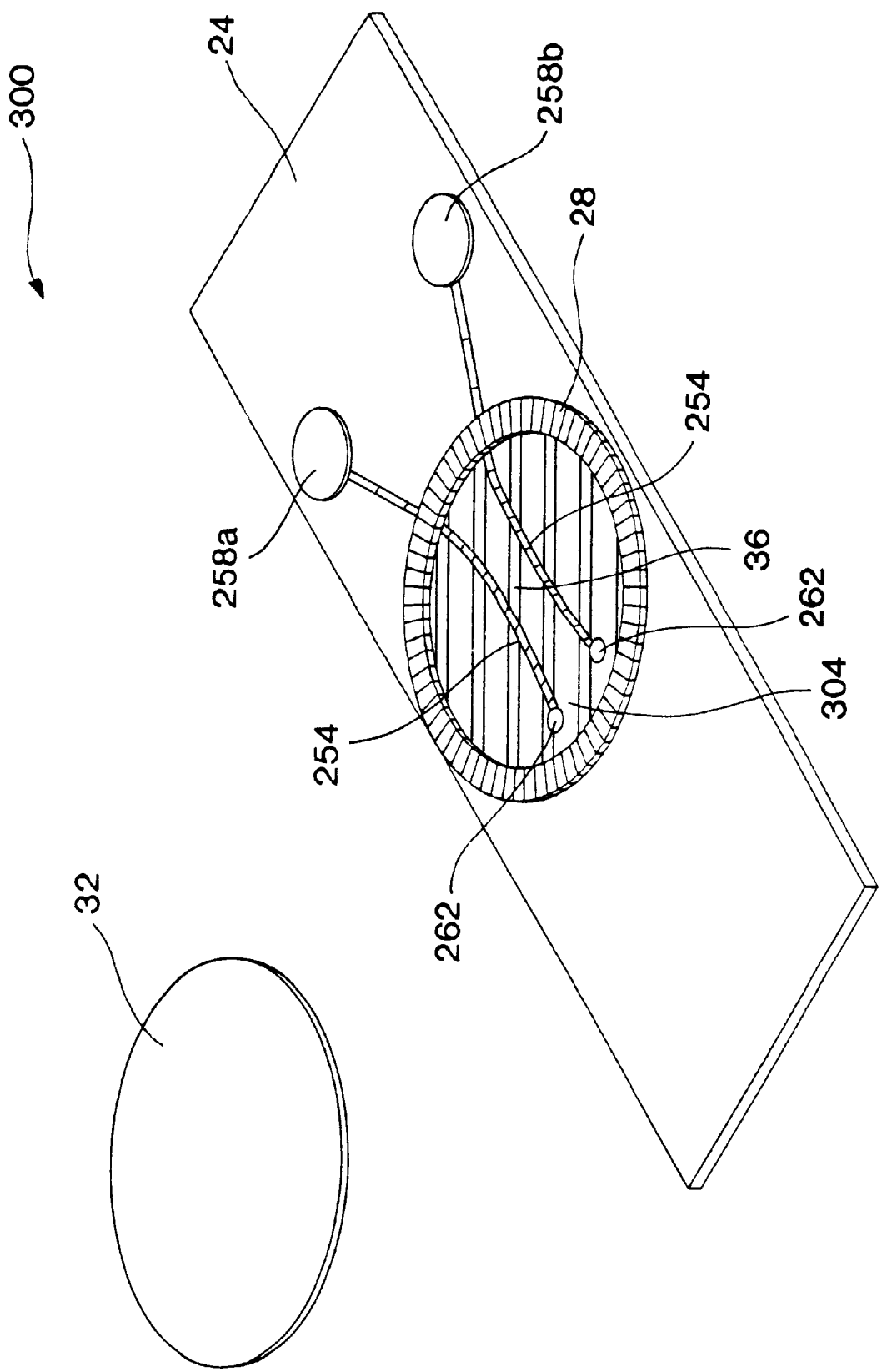
FIG. 9 shows the microscope slide system of FIG. 8 further including a coating in a sample area.

In FIG. 9, a slide system 300 which is similar to slide system 250 is shown. Slide system 300 includes the features of slide system 250 and further comprises a coating 304 which has been applied to sample area 36. Coating 304 can be included to provide an acceptably smooth surface which can be more easily sealed with adhesive 28 and/or can comprise dielectric, insulating or semiconductor materials or can comprise selectively reflective materials which can act as optical filters. Further, coating 304 can be biologically or chemically inert to prevent direct contact between conductors 254 and sample material in sample area 36 this can, for example, prevent unwanted chemical reactions between a sample material and conductors 254.

Figure 10:
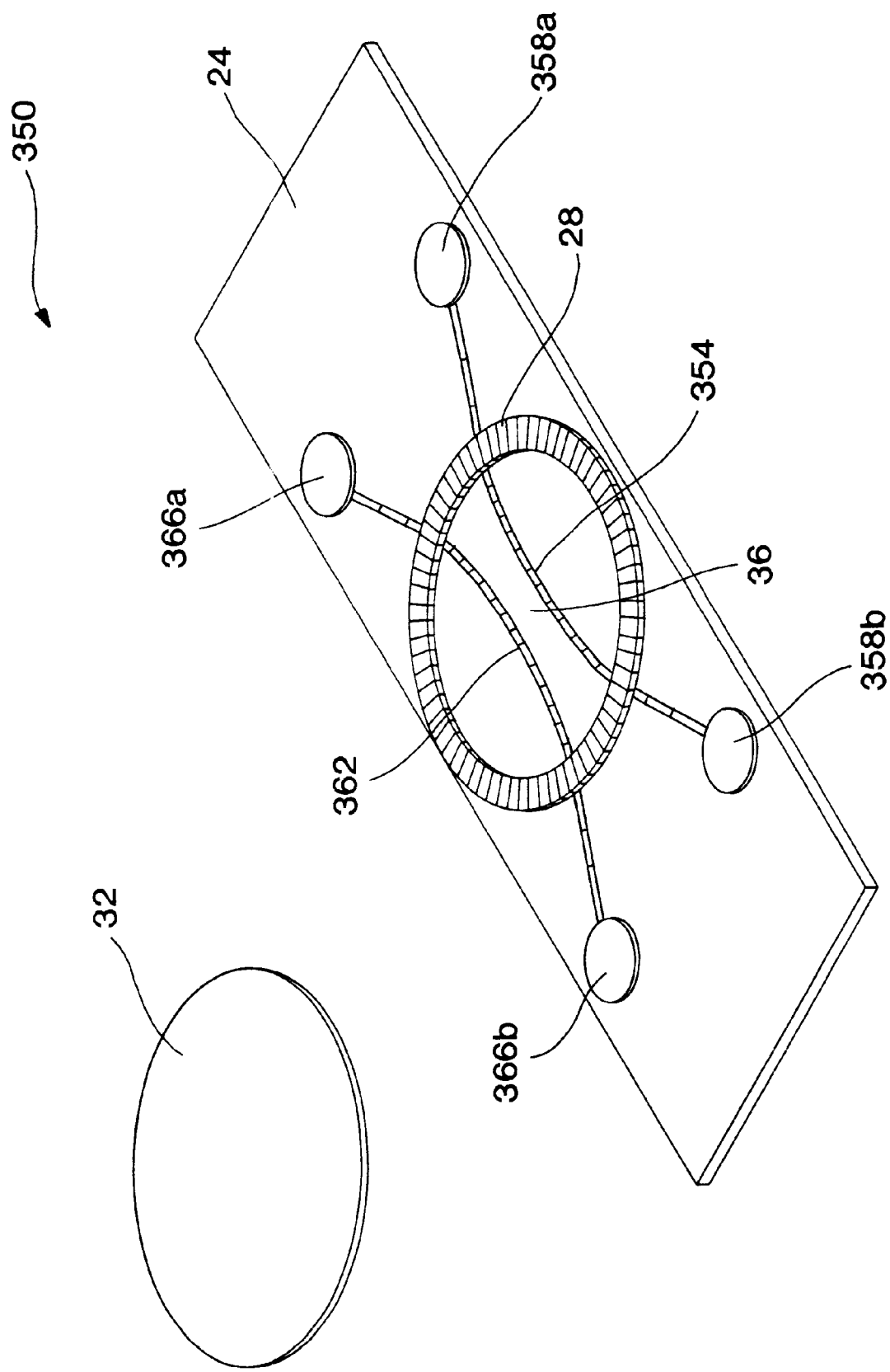
FIG. 10 shows another microscope slide system in accordance with the present invention which includes electrical conductors in a sample area.

Another slide system in accordance with the present invention is indicated generally at 350 in FIG. 10. In system 350, a conductor 354 extends through sample area 36, between contacts 358a and 358b and a conductor 362 extends through sample area 36 between contacts 366a and 366b. Electric potentials can be applied between contacts 358a, 358b and/or 366a, 366b to create electro-magnetic, radio frequency or electrical fields in sample space 36 to observe the reaction of a sample material to an applied field. As will be apparent to those of skill in the art, for observation of only electro-magnetic effects, a single conductor can be employed, provided that each end of the conductor extends out of sample area 36.

Conductors 354 and 362 can be deposited in helical, grid or linear patterns using known semiconductor techniques, printed circuit board fabrication techniques or any other suitable techniques, as will occur to those of skill in the art. It is also contemplated that conductors 354 and 362 can also be coated with thin layers of optically transparent materials (i.e.—materials which are transparent to the light wavelengths (visible, IR, UV, X-ray etc.) used to observe the sample material), such as insulating, dielectric, or semiconducting materials. The coating can be selected to permit different kinds of testing to be carried out on samples and/or to prevent contamination of the sample material by conductors 354 and 362. Further, while referred to herein as conductors, conductors 354 and 362 can also be formed of resistive or semi-conductor materials for other uses. For example, if formed of resistive material, conductors 354 and/or 362 can be used to apply heat to sample area 36. If formed of semiconducting materials, changes in the resistance of conductors 358 and/or 362 can be measured to identify various conditions within sample area 36. It is further contemplated that sample area 36 can be provided with a coating (not shown), similar to coating 304 of slide system 300, which can comprise dielectric, insulating, semiconductor or selectively reflective materials as desired.

Figure 11:
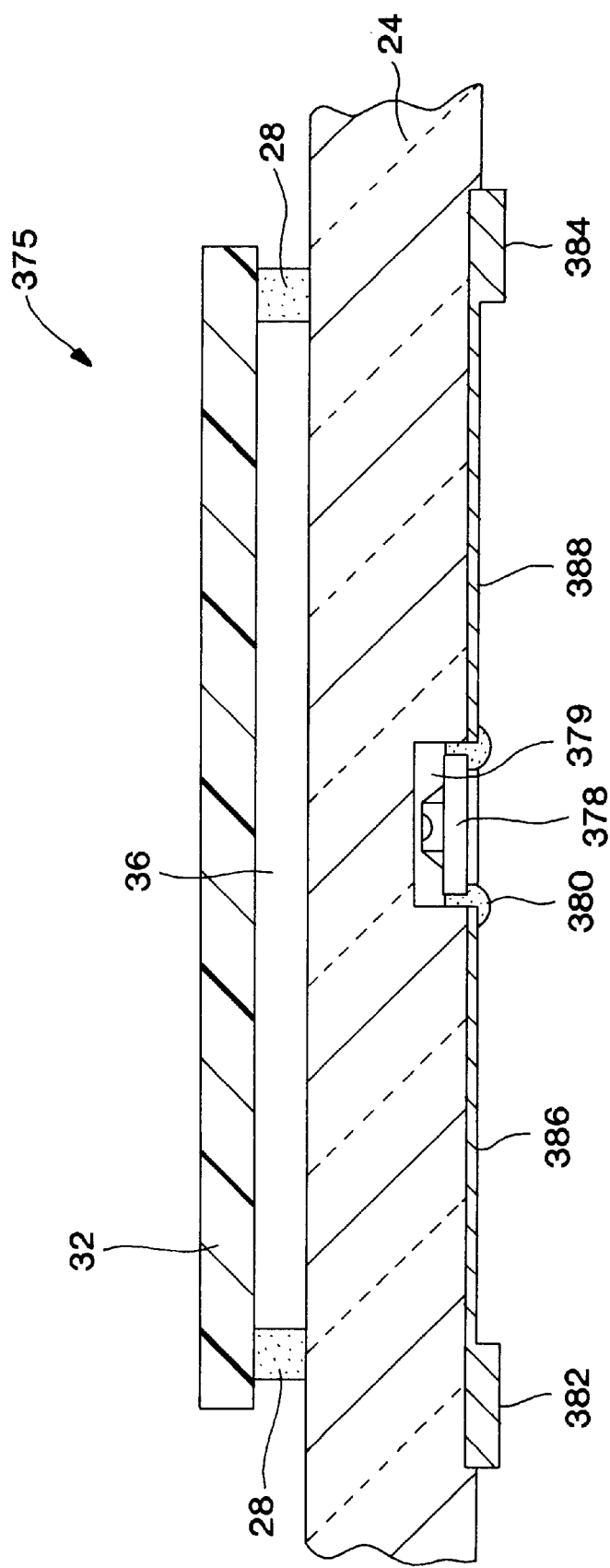
FIG. 11 shows a cross section through a sample area of an assembled slide of another microscope slide system in accordance with the present invention which includes an electric circuit component.

Another slide system in accordance with the present invention is indicated generally at 375 in FIG. 11. In slide system 375, one or more various small electric circuit components 378 can also be placed in sample area 36 using a variety of known techniques, such as surface mount technology (SMT) or semiconductor components or the like can be fabricated in situ, using known techniques. For example, a small thermocouple could be mounted within the sample area to measure the temperature within sample area 36. The components can be coated with adhesives, optical compounds and/or inert materials to prevent them from contaminating the sample material in sample area 36 or interfering with optical observations therein.

In the example of FIG. 11, component 378 has been mounted in a well 379 formed in the underside of slide base 24 and which is maintained in place by as electrically conductive epoxy 380 which electrically connects component 378 to contacts 382 and 384 via conductors 386 and 388.

Other components 378 which can be provided include light sources, such as light emitting diodes (LED) or surface mount semiconductor laser devices which can be mounted on, or embedded in slide base 24 and connected to suitable electrical supplies via conductors. For example, it is contemplated that a light source can be mounted in the center of, and flush with, the surface of sample area 36. The light source can be selected appropriately to yield an extremely bright and compact light source right at the surface of slide base 24, thereby providing an efficient means to illuminate sample material therein. In use, the researcher will place the sample material directly over the light source in sample area 36, or will place enough sample material in sample area 36 to ensure that some will be directly over the light source, and will enclose the sample material with cover slip 32 which is adhered to adhesive 28. The microscope's objective lens is then focused on the bundle of light rays radiating from the light source which illuminate the sample material. Further, it is contemplated that the LED spread function can be matched to the numerical aperture of the microscope objective in order to optimize the proportion of the light captured by the objective, thereby producing a brighter final image.

As will be apparent, this method of illumination can be used to effectively illuminate sample material with monochromatic light by selection of a light source which emits light in a specific range of wavelengths. For example, LED's of gallium nitride on silicone carbide produce light with a center wavelength of 430 nanometers. It is contemplated that microscopy work can be performed using these LED light sources or semiconductor laser or other light sources to produce very high resolution images that are relatively free from chromatic aberrations.

Another component 378 which can be employed is a measuring photodiode. Such as photodiode can be integrally mounted in sample area 36 to monitor the brightness of the illuminating light and to provide a feed back signal to a control system which stabilizes the output of the illuminating lamp. In this case, the photodiode is mounted very close to sample area 36, or within sample area 36 and, as the sample material is illuminated either by conventional lighting or by LED or laser light source methods described above, the photodiode produces an electrical signal which is indicative of the illuminating light energy. This electrical signal can then fed to a control which can control the power supply to the light source, operate an iris, neutral density filter or LCD Shutter, etc.

As will be apparent, different photodiodes can be used to monitor different wavelengths of light. For example, a silicon carbide or gallium nitride photodiode can be used to monitor the intensity of an ultraviolet (UV) light source and a silicon photodiode can be used to monitor the intensity of visible light source and an indium gallium arsenide photodiode can be used to monitor the intensity of an infra red light source and these photodiodes can be included either individually, or in combination, as desired.

Yet another component 378 which can be employed are piezoelectric components, such as piezoelectric transducers and their related conductors. These piezoelectric transducers can be used to create acoustic fields in sample area 36 to, for example, study the effect of acoustic waves on the sample. The same transducers can be used to detect acoustical emissions emanating from the sample material during examination. Further, in the micro perfusion embodiment of a slide system in accordance with the present invention which is described below, such transducers can be used to provide information on flow rates, particulate loadings and fluid characteristics using known ultrasonic Doppler techniques. As mentioned before, piezoelectric transducers can be mounted adjacent sample area 36 via any suitable technique, such as SMT, or can be fabricated in situ using known techniques.

Figure 12:
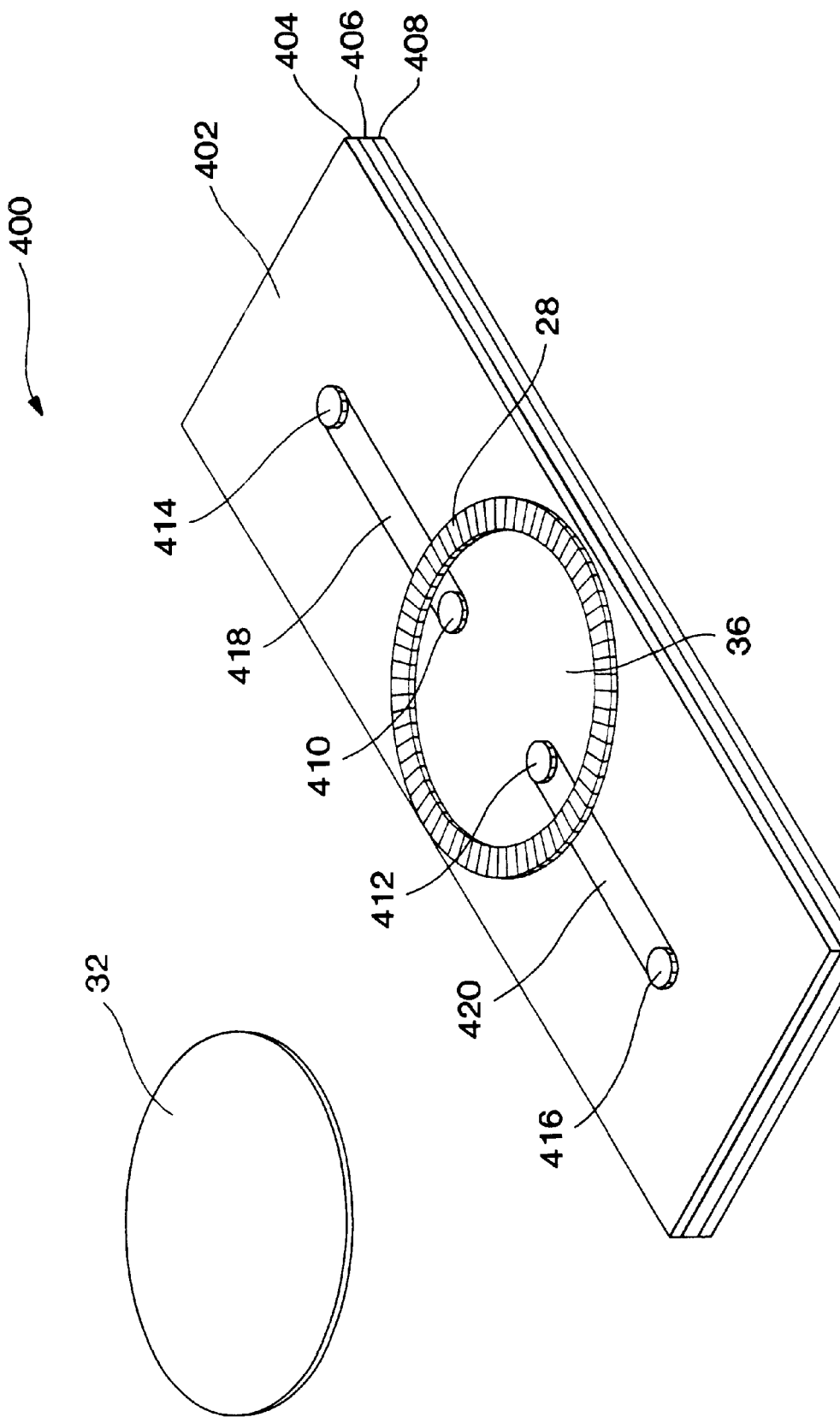
FIG. 12 shows another microscope slide system in accordance with the present invention which includes a pair of microperfusion ports.

Another slide system in accordance with the present invention is indicated generally at 400 in FIG. 12. In slide system 400, slide base 402 is fabricated from three layers 404, 406 and 408 of suitable material, such as any of the optical plastic and/or glasses mentioned above which are bonded together via any suitable technique as will occur to those of skill in the art. A pair of micro perfusion ports 410 and 412 are provided in sample area 36 and are formed, prior to bonding of layers 404, 406 and 408 together by drilling ports 410 and 412 and connection ports 414 and 416 in layer 404. Next, grooves or slots 418 and 420 are formed in layer 406 such that, when slide base 402 is assembled from layers 404, 406 and 408, connection port 416 and microperfusion port 412 are in fluid connection via slot 420 and microperfusion port 410 and connection port 414 are in fluid connection via slot 418. As will be apparent to those of skill in the art, such ports can also be provided vertically through slide base 402 or cover slip 32.

Microperfusion ports 410 and 412 permit gases, nutrients, fluids, renewed sample material, etc. to be delivered to and/or removed from sample area 36. For example, nutrients or chemicals can be delivered to sample area 36 to permit microscopic examination of the growth of an organic, inorganic or living system. In the case of an inorganic system, it is possible to watch the formation of crystals in real time. Further, it is possible to observe a cellular, parasitic, bacterial or viral culture and supply it with nutrients it requires over a relatively long period of time. Further, fluid flow through port 412 and 416 can also be used to cool or heat the sample material in sample area 36.

Further, micro perfusion ports can be used to supply different substances to sample area 36 to observe their effect on the sample material. For example, in the area of cellular research, these ports can be used to supply different nutrients or different chemical substances to cells in sample area 36. In this way it is possible to use the slide system of the present invention to microscopically observe the effect and/or damage caused by chemicals or biological hazards to living cells or chemical processes and compounds.

Those of skill in the art will realize that ports 410 and 412 can be fabricated in a variety of manners, including by etching the surface of one or both layers of a double layer slide base. In this case, two corresponding mirror-image grooves are etched on the surface of one face of each layer base and the ports drilled or etched through the top layer, connecting with the groove on the top layer. The layers are then bonded together to create the microperfusion port and the connector port. In addition, it is also contemplated that the ports can be of several different configurations, shapes, and numbers depending on their desired use.

Figure 13:
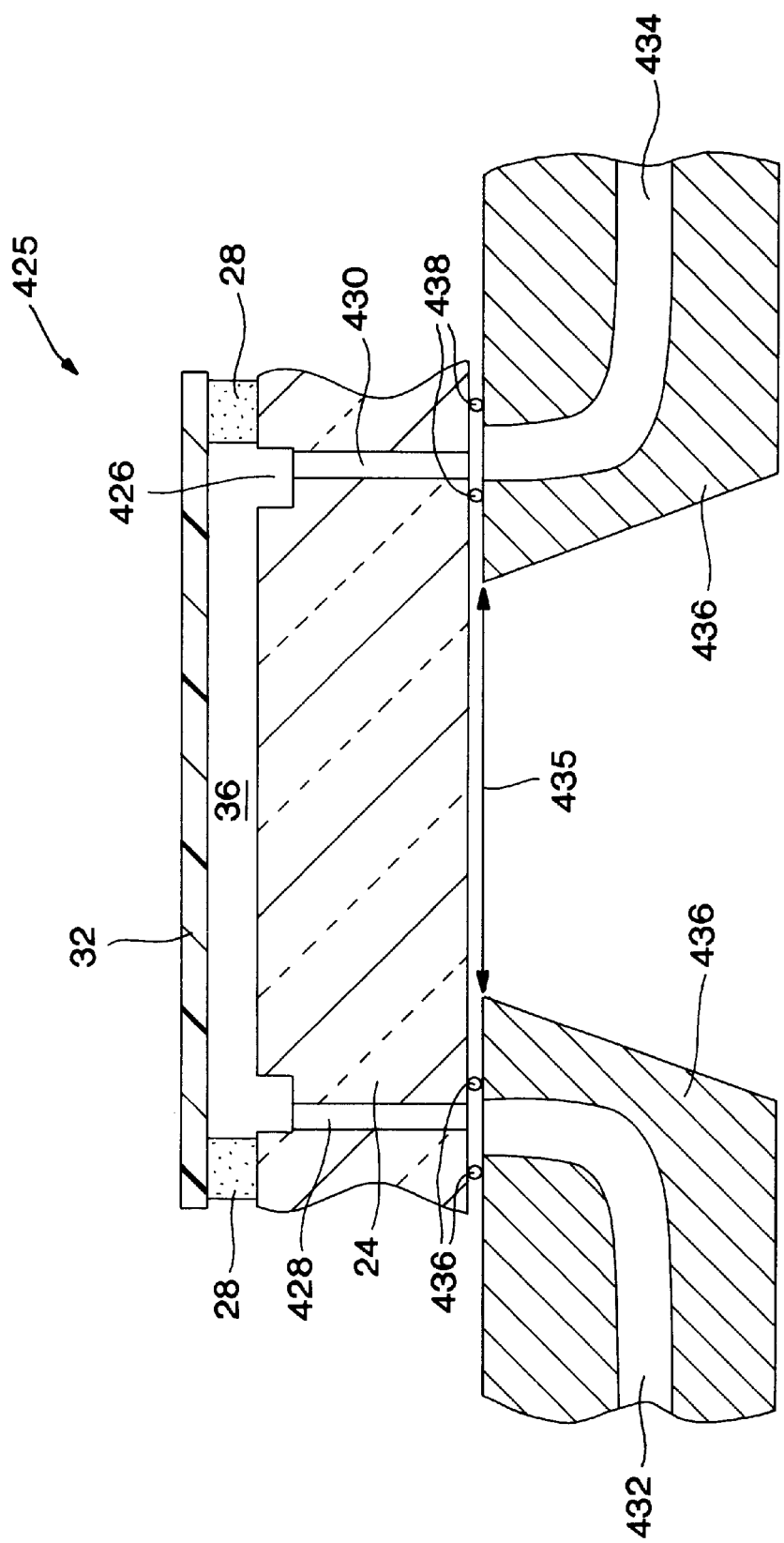
FIG. 13 shows a cross section through a sample area of an assembled slide of another microscope slide system in accordance with the present invention which includes a pair of microperfusion ports connected on the lower surface of the slide.

Another slide system in accordance with the present invention is indicated generally at 425 in FIG. 13. In slide system 425, sample area 36 includes a moat 426 to which two microperfusion ports 428 and 430 are connected. As shown in the Figure, ports 428 and 430 extend downward through slide base 24 and respectively engage inlet 432 and outlet 434 conduits on a microscope stage 436 which includes a central passage 435 to allow light to pass through sample area 36. The connection between port 428 and inlet conduit 432 is sealed by an O-ring 436 and the connection between port 430 and outlet conduit 434 is sealed by a similar O-ring 438. A slide assembled with slide system 425 is maintained in contact with stage 436, thus maintaining the seal between port 428 and conduit 432 and between port 430 and conduit 434 by any suitable means, as will occur to those of skill in the art.

Slide system 425 allows various materials to be supplied and removed from sample area 36, through moat 426. One perceived advantage of system 425 of that of system 400 is that it only requires a single layer slide base 24, reducing the cost and manufacturing time for system 425, although requiring a suitable stage 436 to be available.

Figure 14:
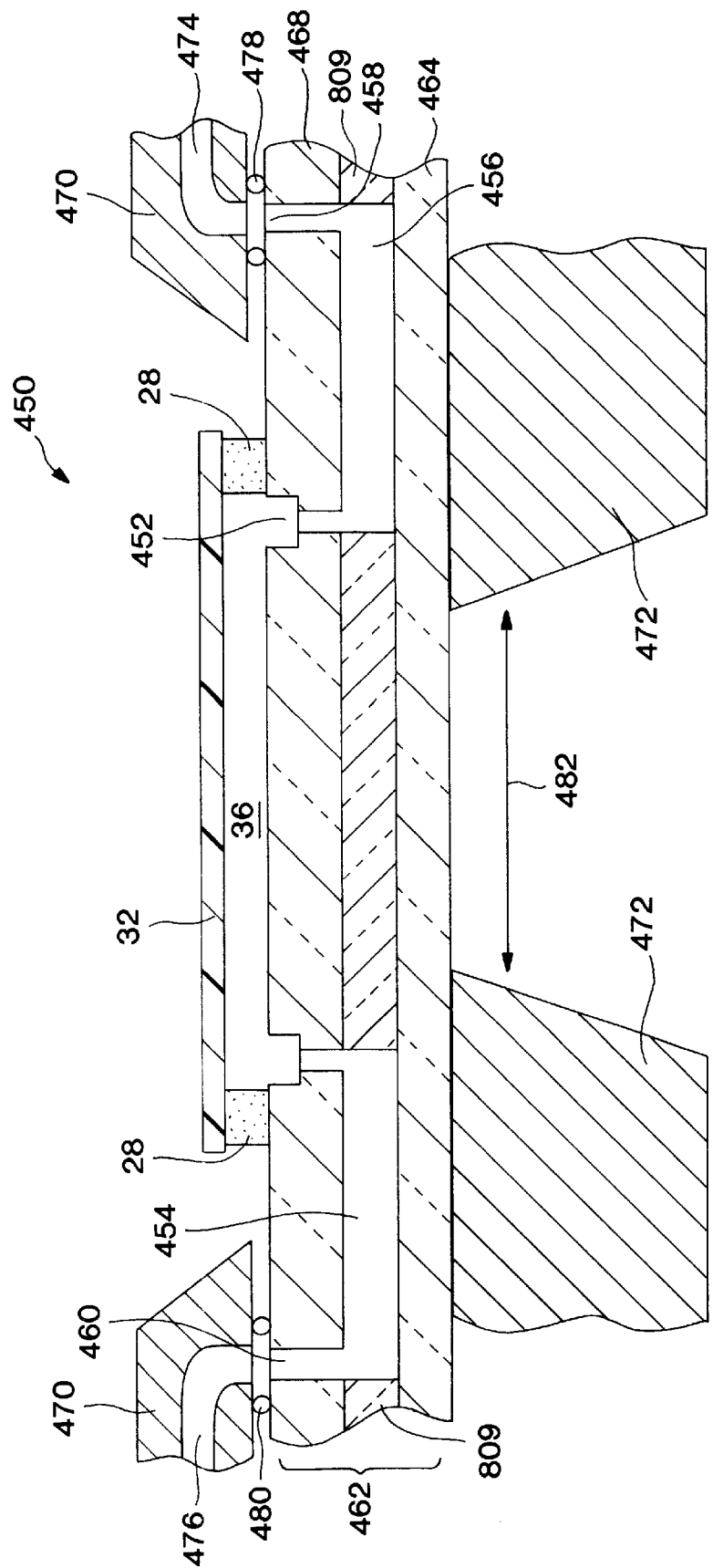
FIG. 14 shows a cross section through a sample area of an assembled slide of another microscope slide system in accordance with the present invention which includes a pair of microperfusion ports connected on the upper surface of the slide.

Another slide system in accordance with the present invention is indicated generally at 450 in FIG. 14. In slide system 450, moat 452 is connected to microperfusion ports 454 and 456 whose connection points 458 and 460 are located on the top surface of slide base 462. As shown, slide base 458 comprises three layers 464, 466 and 468. Layer 464 is a continuous layer, while layers 466 and 468 have various features relating to microperfusion ports 454 and 456 formed therein, as shown in the Figure. As also shown in the Figure, a clamping device 470 operates in conjunction with a conventional stage 472 to maintain an assembled slide from slide system 450 in place. Clamping device 470 includes conduits 474 and 476 to connect to connection points 458 and 460 respectively and O-rings 478 and 480 seal the connections therebetween. Stage 472 includes an aperture 482 to allow light to pass through sample area 36.

Figure 15:
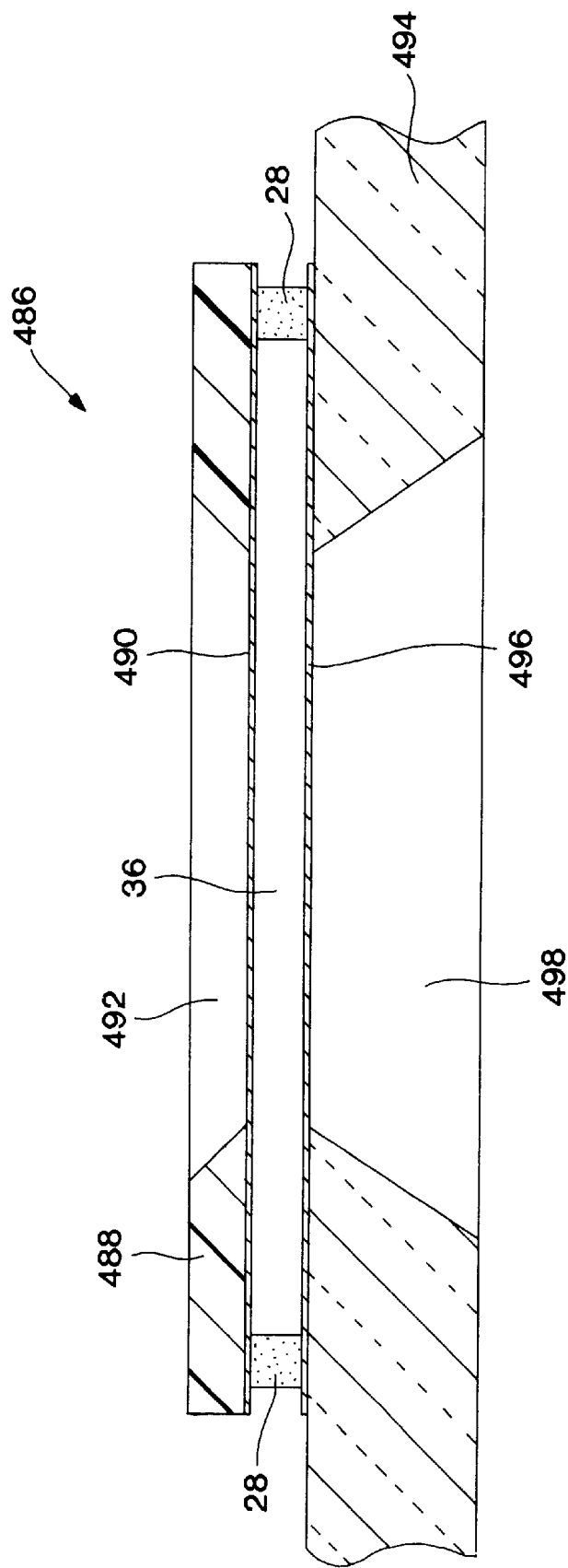
FIG. 15 shows a cross-section through a sample area of a microscope slide system in accordance with the present invention which includes thin films of metal or other suitable materials.

Another slide system in accordance with the present invention is indicated generally at 486 in FIG. 15. Slide system 486 is intended for deep UV and X-ray microscopy use wherein optical glass or plastic is opaque or otherwise not sufficiently transparent to the desired wavelengths. In slide system 486, cover slip 488 has a thin layer 490 of a metallic, crystalline or any other suitable material which is transparent to the desired wavelength applied to its underside. Next, the material of cover slip 488 above layer 490 in sample area 36 is removed by any suitable means, such as etching, machining etc. until only layer 490 remains. Thus, an aperture 492 is formed to expose the upper side of layer 490, the lower side of layer 490 forming part of sample area 36. The outer ring of material from cover slip 488 is left to physically strengthen cover slip 488 to permit handling thereof.

Slide base 494 has a thin layer 496 of a metallic film or a crystalline film which is transparent to the desired wavelength, or reflective thereto, applied to its top side in sample area 36. The material of slide base 494, under layer 496, in sample area 36 is removed by any suitable means, such as etching or machining, to form an aperture 498 to expose the lower side of layer 496, the upper side of layer 496 forming part of sample area 36. Thus, light of an appropriate wavelength need only pass through layer 490 and/or layer 496 to illuminate sample material in sample area 36.

The present invention is not limited to the particular combinations of features described above, as will be apparent to those of skill in the art. For example, active element 154 of slide system 150 can also be provided in any of the other slide systems. Other desirable combinations of features will be apparent to those of skill in the art and do not depart from the scope of the present invention.

Figure 16:
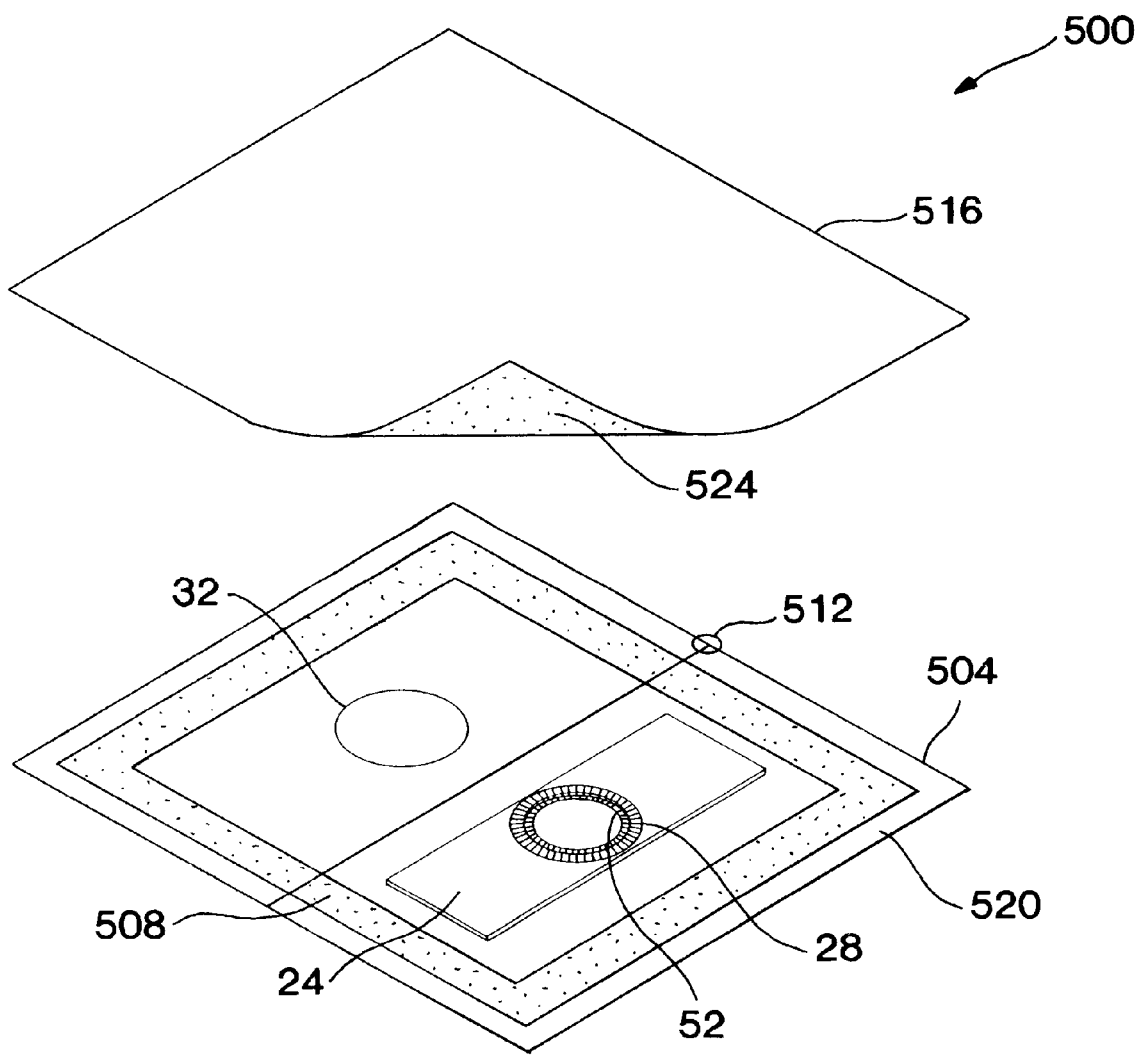
FIG. 16 shows a package for delivering a microscope slide system in accordance with the present invention.

The slide systems of the present invention can be provided in sterile and substantially contaminate-free form in a sealed paper or a plastic film protective package. In FIG. 16, such as package is indicated generally at 500. In this example, package 500 contains slide system 100, described above.

Package 500 includes a base sheet 504 to which slide base 24 and cover slip 32 are affixed by a low tack releasible adhesive 508. Adhesive 508 is selected to allows base sheet 504 to be easily separated from slide base 24 and cover slip 32 without leaving an optical residue. As shown, base sheet 504 includes a score line 512 from which the center of sample area 36 and the center of cover slip 32 are equispaced. Thus, when base sheet 504 is folded at score line 512, cover slip 32 is brought into contact with adhesive 28 in the desired, centered, position.

Package 500 further includes a top sheet 516 which is sealed to base sheet 504 via a releasible adhesive 520 coating located about the border of the base sheet 504. Preferably, adhesive 520 is selected to ensure that package 500 cannot be re-closed without clear evidence of its having been opened, i.e.—it is a tamper-resistant package. Top sheet 516 includes a release coating 524 on its bottom surface so that it will easily peel away from adhesive 28 on slide base 24 without reducing the ability of adhesive 28 to adhere to cover slip 32 when the slide is used. As will be apparent to those of skill in the art, slide system 100 and package 500 are sterile and can be manufactured under clean room conditions to reduce the change that contaminants reach sample area 36.

In order to use system 100 supplied in package 500, the top sheet 516 is peeled off bottom sheet 504 to reveal slide base 24 and cover slip 32. A selected amount of sample material and/or mountant is applied to sample area 36 and the slide is closed by folding base sheet 504 at score 512, bringing cover slip 32 into contact with adhesive 28. Once cover slip 32 has contacted the adhesive 28, the user applies pressure through folded bottom sheet 504 to compress the sandwich of slide base 24 and cover slip 32 and to thereby set adhesive 28 sealing sample area 36. Bottom sheet 504, which is now on the top and bottom of the sandwich, is peeled away from the finished slide.

Figure 17:
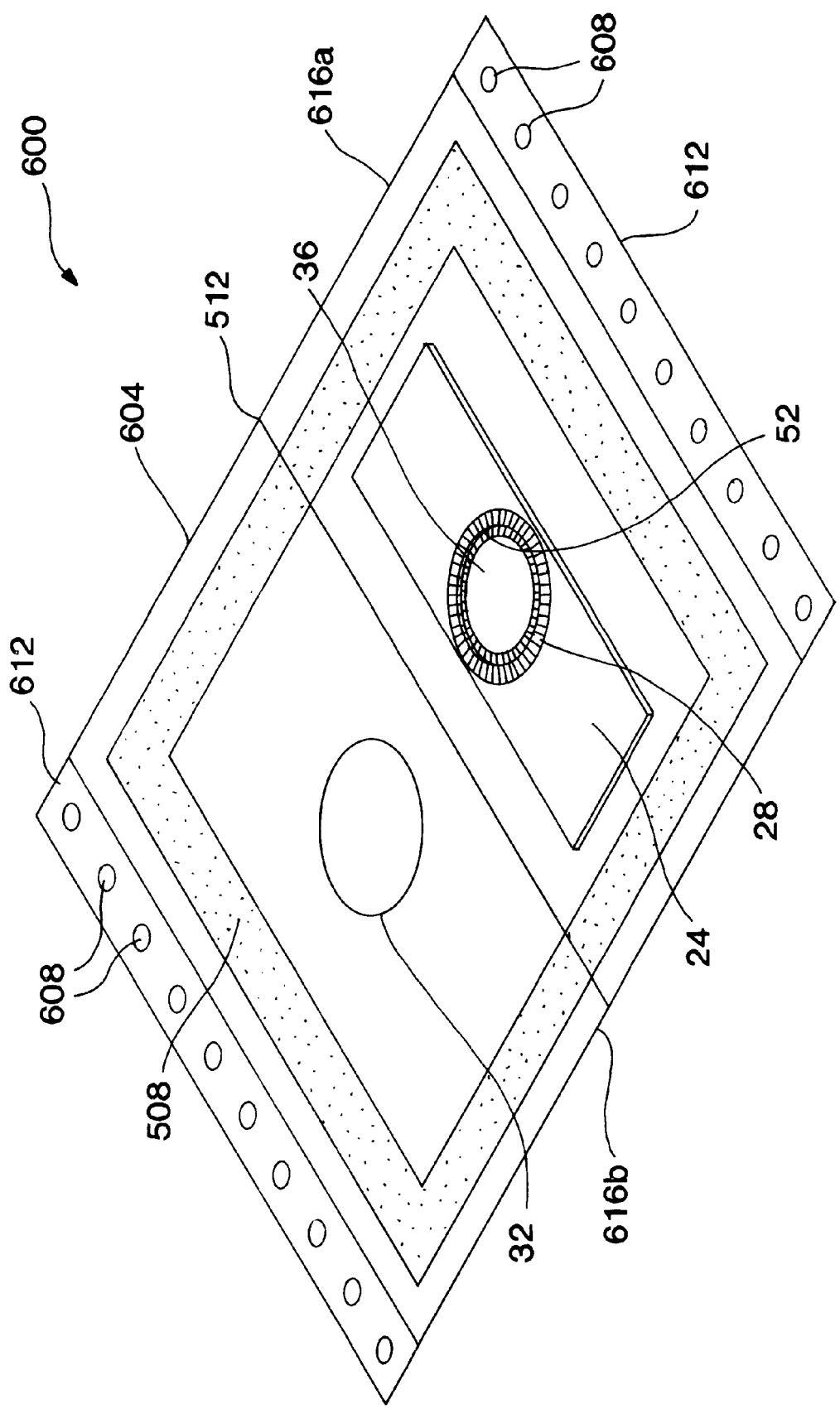
FIG. 17 shows another package for delivering a microscope slide system in accordance with the present invention.

FIG. 17, shows another example of a slide system package 600, which is preferred for use in an automated slide preparation systems. In FIG. 17, like components to those shown in FIG. 16 are indicated with like reference numerals. As shown, package 600 includes a base sheet 604 with a series of regularly spaced locating perforations 608 adjacent opposite edges 612. It is contemplated that a continuous series of bottom sheets 604 will be provided, wherein edge 616*a* is connected to edge 616*b* of the next base sheet 604. A perforated tear line (not shown) can be provided between adjacent packages 600 if desired. During an automated slide preparation process, the supply of bottom sheets 604 is moved by engagement of sprockets with locating perforations 608. A top sheet, not shown, similar to top sheet 516 in FIG. 16, covers at least slide base 24 and cover slip 32 to maintain sterility and cleanliness of the contents of package 600 and is adhered thereto via a suitable adhesive, as was the case with package 500.

An example of an automated slide preparation process will now be described. A supply of packages 600, with slide bases 24 and cover slips 32 therein, is transported along an assembly line by suitable sprockets which engage locating perforations 608. The top sheet is separated from base sheet 604 by any suitable means, such as a roller, to expose slide base 24 and cover slip 32. Bottom sheet 604 is transported to the area of a dispenser of sample material which is arranged to deliver a measured amount of the sample material to sample area 36, as determined by the relative positioning of perforations 608. A folding machine, well known in the paper handing industry, folds bottom sheet 604 at score line 512 to bring cover slip 32 into engagement with adhesive 28 to provide a slide with a preliminary seal. Bottom sheet 604 is then removed from the slide which is then transported to a final closing press which applies a predetermined pressure to firmly close cover slip 32 to slide base 24. The thickness of the finished slide is then checked and, when confirmed, the finished slide is placed in a delivery tray. The finished slide can also be labelled with suitable identification data to identify the sample material enclosed in the slide.

The packaging of a slide system in accordance with the present invention is presently believed to be particularly advantageous. Packages 500 and 600 serves both as a method of storing unused slide systems in a sterile and clean manner and a method of producing a finished slide wherein the microscopist need not directly touch the slide base or cover slip to scaling the sample area. The bottom sheets 504 and 604 also help to inhibit the transfer of any hazardous material from the slide to the microscopist's hands.

As stated earlier, it is understood that no optical residue (i.e.—residue which will interfere with the resolving of a desired image within sample area 36) from adhesive 508 on bottom sheets 504 and 604 will remain on the bottom of slide base 24, especially within the area of sample area 36. Accordingly, adhesive 508 should be carefully selected to ensure that it will not leave an undesired optical residue. Alternatively, the adhesive may be located on bottom sheets 504 and 604 so that it only contacts a peripheral area of slide base 24 and cover slip 32 to avoid possible contamination of the sample area 36 of slide base 24 or cover slip 32.

It is contemplated that the sterility of package 500 or 600 can be accomplished either by radioactive sterilization or by heat sterilization and packaging is preferably performed in a clean room environment. A benefit to radioactive sterilization is it can be performed after the slide system has be packaged.

It is also contamplated that, as described above, in some circumstances a slide system in accordance with the present invention will be provided without adhesive 28 wherein an expansion volume surrounds sample area 36. In such a case, use of package 500 or 600 for such a system will involve a user removing cover slip 32 from bottom sheet 504 or 604 with an appropriate tool to maintain sterility and/or to prevent contamination, and then place cover slip 32 onto the sample material in sample area 36 in a conventional manner. Even in this case, it is believed that packages 500 and/or 600 provide significant advantages over prior methods of supplying slides and cover slips for microscopy.

As will be apparent to those of skill in the art, the present invention provides many advantages and improvements over conventional slides for microscopy. Embodiments of the present invention can be used for live or fixed specimens of biological, organic or inorganic matter. The present invention is believed to be particularly suited for use with living sample materials, including bacteria, vital fluids such as blood and lymphatic fluid, parasites, or viruses or combinations thereof. The present invention can also be used to study the interaction of living material with chemicals; biological products; electric, magnetic, photo, or acoustic fields; ionizing or other radiations; and other living material.

In addition, the present invention provides a microscope slide system and a method of producing high quality slides which are free of contamination and artifacts and which help maintain sterile conditions during the slide preparation process. Embodiments of the present invention provide a range of features which aid the researcher. In addition, it will now be appreciated that the present invention includes embodiments having features which provide safeguards by means of adhesives, expansion zones, and neutralization zones to reduce the risk of hazardous materials escaping from the sample space and reaching the working environment.

The above-described embodiments of the invention are intended to be examples of the present invention and alterations and modifications may be effected thereto, by those of skill in the art, without departing from the scope of the invention which is defined solely by the claims appended hereto.

I claim:

1. A slide system for microscopy comprising:
   a slide base including at least one expansion volume formed in said slide base, said at least one expansion volume substantially surrounding a sample area on said slide base;
   a planar cover slip; and
   a continuous adhesive layer on a surface of at least one of said slide base and said cover slip, said adhesive layer surrounding said sample area and said at least one expansion volume when said slide base and planar cover slip are engaged with said adhesive layer to form an assembled slide, said adhesive layer and said planar cover slip enclose and define a sealed sample area inhibiting migration of sample material out of said sealed sample area and inhibiting migration of contaminants into sealed sample area.

2. A slide system according to claim 1 wherein said adhesive layer is located on said slide base.

3. A slide system according to claim 1 further including at least one active element surrounding said expansion volume and being between said adhesive layer and said expansion volume within said sealed sample area when said slide is assembled.

4. A slide system according to claim 3 including two expansion volumes is said slide base, said active element being between the outermost of said two expansion volumes and said adhesive when said slide is assembled.

5. A slide system according to claim 3 wherein said active element is an antibiotic.

6. A slide system according to claim 3 wherein said active element is an antiseptic.

7. A slide system according to claim 1 further comprising at least one test material applied to at least one of said slide base and cover slip such that said test material is within said sealed sample area.

8. A slide system according to claim 7 including at least two test materials, at least one of said test materials being applied to said slide base and at least another of said at least two test materials being applied to said cover slip such that, when said sealed sample area is formed, said test materials on said cover slip are proximal said test materials on said slide base.

9. A slide system according to claim 1 wherein each of said slide base, said cover slip and said adhesive have a preselected thickness such that, when said assembled slide is formed it has a preselected overall thickness.

10. A slide system according to claim 9 wherein said preselected thickness of each of said slide base, said cover slip and said adhesive are different.

11. A slide system according to claim 9 further comprising a recess in said slide base, said adhesive being placed in said recess.

12. A slide system according to claim 9 further comprising a spacer having first and second sides and a preselected thickness and wherein said spacer surrounds said expansion volume and said first side engages said adhesive layer and said second side includes an adhesive to engage the other of said slide base and planar cover slip, said sealed sample area being formed by said slide base, spacer, each of said adhesives and said cover slip.

13. A slide system according to claim 1 wherein said adhesive is releasible.

14. A slide system according to claim 7 wherein said test material comprises a stain.

15. A slide system according to claim 14 wherein said stain is biohazardous.

16. A method of preparing a slide for microscopy, comprising the steps of:
   (i) placing a sample material on a sample area of a slide base, said sample area being substantially surrounded by an expansion volume formed in said slide base and said expansion volume being surrounded by an adhesive material on said slide base;
   (ii) locating a planar cover slip over said sample area to engage said adhesive material; and
   (iii) pressing said planar slide cover and said slide base to form a sealed sample area inhibiting sample material from leaving said sealed sample area and inhibiting contaminants from entering said sealed sample area.

17. The method of claim 16 wherein step (iii) is performed with a preselected force.

18. The method of claim 16 wherein in step (iii) said pressing is performed until a pre-selected thickness of said sample area on said prepared slide is obtained.

19. A slide system for microscopy comprising:
   a slide base;
   a cover slip;
   an adhesive layer on a surface of at least one of said slide base and said cover slip; and
   at least two expansion volumes formed on at least one of said slide base and cover slip within said adhesive layer, a first of said at least two expansion volumes being adjacent said adhesive layer and a second of said two expansion volumes being spaced from said first expansion volume by a land, said adhesive layer surrounding a portion of said surface such that when said slide base and cover slip are engaged with said adhesive layer to form an assembled slide, said adhesive layer and said cover slip enclose a sealed sample area.

* * * * *